(12) United States Patent
Luo et al.

(10) Patent No.: US 11,042,680 B2
(45) Date of Patent: Jun. 22, 2021

(54) IC TEST INFORMATION MANAGEMENT SYSTEM BASED ON INDUSTRIAL INTERNET

(71) Applicant: Sino IC Technology Co., Ltd., Shanghai (CN)

(72) Inventors: Bin Luo, Shanghai (CN); Jianhua Qi, Shanghai (CN); Jianbo Ling, Shanghai (CN); Huiwei Liu, Shanghai (CN); Xuefei Tang, Shanghai (CN); Haiying Ji, Shanghai (CN)

(73) Assignee: Sino IC Technology Co., Ltd., Shanghai (CN)

( * ) Notice: Subject to any disclaimer, the term of this patent is extended or adjusted under 35 U.S.C. 154(b) by 0 days.

(21) Appl. No.: 16/521,926

(22) Filed: Jul. 25, 2019

(65) Prior Publication Data

US 2020/0089820 A1    Mar. 19, 2020

Related U.S. Application Data

(63) Continuation of application No. PCT/CN2019/090313, filed on Jun. 6, 2019.

(30) Foreign Application Priority Data

Sep. 14, 2018   (CN) .......................... 201811075156.0

(51) Int. Cl.
   *G06F 30/3323*    (2020.01)
   *G06F 30/20*      (2020.01)
   (Continued)

(52) U.S. Cl.
   CPC .......... *G06F 30/3323* (2020.01); *G06F 30/20* (2020.01); *G06F 30/33* (2020.01);
   (Continued)

(58) Field of Classification Search
   CPC ...... G06F 30/3323; G06F 30/20; G06F 30/33; G06F 30/3308; G06F 30/398; G06F 2119/18; G06F 2119/22; G06Q 10/107
   (Continued)

(56) References Cited

U.S. PATENT DOCUMENTS 5,046,033 A * 9/1991 Andreasen ..... G01R 31/318307
                                                702/119
5,206,582 A * 4/1993 Ekstedt ................ G01R 31/316
                                                324/73.1

(Continued)

OTHER PUBLICATIONS

"Verification, Validation, Testing of ASIC/SOC designs—What are the differences?", https://anysilicon.com/verification-validation-testing-asicsoc-designs-differences, Sep. 18, 2016, 4 pages. (Year: 2016).*

*Primary Examiner* — Phallaka Kik

(57) ABSTRACT

The present invention discloses an information management method and system for IC tests, and a storage medium. The method comprises steps of: providing test data generated by performing an IC test by an IC test platform, the IC test platform being an IC test platform having more than one stage, each stage of the IC test platform comprising a plurality of test devices: providing resource data related to the IC test, other than the test data; and analyzing the IC test according to the test data of the IC test and the resource data, to obtain result data related to the IC test. In this way, the present invention can provide technical support for utilizing the value of test data generated in IC tests.

11 Claims, 22 Drawing Sheets

(51) Int. Cl.
*G06F 30/33* (2020.01)
*G06F 30/3308* (2020.01)
*G06F 30/398* (2020.01)
*G06Q 10/10* (2012.01)
*G06F 119/22* (2020.01)
*G06F 119/18* (2020.01)

(52) U.S. Cl.
CPC ........ *G06F 30/3308* (2020.01); *G06F 30/398* (2020.01); *G06F 2119/18* (2020.01); *G06F 2119/22* (2020.01); *G06Q 10/107* (2013.01)

(58) Field of Classification Search
USPC ................ 716/106, 52, 53, 54, 55, 56, 136; 703/14; 702/57, 84, 118; 324/512; 700/97, 108
See application file for complete search history.

(56) References Cited

U.S. PATENT DOCUMENTS

| | | | | |
|---|---|---|---|---|
| 5,510,724 A * | 4/1996 | Itoyama | ............ | G01R 31/2849 324/750.05 |
| 5,539,652 A * | 7/1996 | Tegethoff | ................ | G06F 30/20 703/14 |
| 6,049,895 A * | 4/2000 | Sugimoto | ...... | G01R 31/318505 714/46 |
| 6,151,695 A * | 11/2000 | Kamo | ................ | G01R 31/2834 714/734 |
| 6,341,259 B1 * | 1/2002 | Gutierrez | ............ | B81C 99/0035 367/140 |
| 6,425,104 B1 * | 7/2002 | Toumiya | ........ | G01R 31/318342 714/738 |
| 6,651,225 B1 * | 11/2003 | Lin | ........................ | G06F 30/331 716/113 |
| 6,708,132 B1 * | 3/2004 | Gutierrez | .............. | B81C 99/005 324/243 |
| 7,020,582 B1 * | 3/2006 | Dicosola | ............ | G01R 31/2831 250/492.22 |
| 7,062,346 B2 * | 6/2006 | Takagi | .................... | H01L 22/20 700/116 |
| 7,225,416 B1 * | 5/2007 | Pritchard | ....... | G01R 31/318314 703/14 |
| 7,334,178 B1 * | 2/2008 | Aulagnier | ...... | G01R 31/318342 713/160 |
| 7,434,197 B1 * | 10/2008 | Dolainsky | ................ | G03F 7/705 716/53 |
| 7,502,659 B2 * | 3/2009 | Beffa | .................. | G01R 31/2894 250/234 |
| 7,913,206 B1 * | 3/2011 | Cadouri | ................ | G06F 30/398 716/106 |
| 8,413,088 B1 * | 4/2013 | Armbruster | ............. | G06F 30/33 716/106 |
| 8,712,718 B1 * | 4/2014 | Camarota | .......... | G01R 31/2851 702/117 |
| 8,819,488 B1 * | 8/2014 | Arguelles | ............ | G06F 11/3688 714/25 |
| 8,972,785 B2 * | 3/2015 | Kahne | .................. | G06F 11/261 714/33 |
| 9,223,915 B1 * | 12/2015 | Ginetti | .................... | G06F 30/33 |
| 9,280,627 B1 * | 3/2016 | Zhang | .................... | G06F 30/33 |
| 10,810,656 B1 * | 10/2020 | McCroskey | .......... | G06F 3/0482 |
| 10,817,410 B2 * | 10/2020 | Nair | ........................... | G06F 8/60 |
| 10,908,012 B2 * | 2/2021 | Bawal | ................. | G01F 25/0007 |
| 2002/0135577 A1 * | 9/2002 | Kase | ..................... | G06T 17/005 345/424 |
| 2003/0221152 A1 * | 11/2003 | Volkerink | ...... | G01R 31/318511 714/736 |
| 2004/0158783 A1 * | 8/2004 | Sun | ....................... | G11C 29/006 714/724 |
| 2005/0172178 A1 * | 8/2005 | Gedamu | .............. | G11C 29/006 714/718 |
| 2005/0172180 A1 * | 8/2005 | Damodaran | ........... | G11C 29/16 714/723 |
| 2006/0132161 A1 * | 6/2006 | Khandros | ........ | G01R 31/31907 324/762.05 |
| 2006/0195814 A1 * | 8/2006 | Tsao | ........................ | G06F 30/00 716/51 |
| 2008/0005704 A1 * | 1/2008 | Miloslavsky | ........... | G03F 7/705 716/52 |
| 2008/0163142 A1 * | 7/2008 | White | ................... | G06F 30/398 716/52 |
| 2009/0007030 A1 * | 1/2009 | Nehmadi | .................... | G03F 1/84 716/136 |
| 2009/0183133 A1 * | 7/2009 | Flemming | ............... | G06F 30/33 716/119 |
| 2009/0295403 A1 * | 12/2009 | Tamai | ............... | G01R 31/31707 324/537 |
| 2009/0299679 A1 * | 12/2009 | Desineni | ............ | G01R 31/2894 702/119 |
| 2010/0222913 A1 * | 9/2010 | Jones | .................... | G05B 19/128 700/115 |
| 2011/0006794 A1 * | 1/2011 | Sellathamby | ...... | G01R 31/3025 324/754.03 |
| 2011/0041003 A1 * | 2/2011 | Pattar | ..................... | H04W 12/10 714/4.3 |
| 2011/0086515 A1 * | 4/2011 | Kodama | ..................... | G03F 1/36 438/761 |
| 2011/0267087 A1 * | 11/2011 | Huang | ............... | G01R 31/2635 324/754.23 |
| 2011/0288808 A1 * | 11/2011 | Fan | ...................... | G01R 31/2894 702/118 |
| 2012/0126846 A1 * | 5/2012 | Jong | .............. | G01R 31/318558 324/762.03 |
| 2012/0198280 A1 * | 8/2012 | Cao | ..................... | G06F 11/3684 714/32 |
| 2014/0181793 A1 * | 6/2014 | Kaliappan | ........... | G06F 11/3672 717/124 |
| 2015/0253380 A1 * | 9/2015 | Schiessl | ............. | G01R 31/3183 702/117 |
| 2016/0196379 A1 * | 7/2016 | Adel | .................... | G03F 7/70625 716/52 |
| 2018/0046453 A1 * | 2/2018 | Nair | ......................... | G06F 8/60 |
| 2018/0048521 A1 * | 2/2018 | Nair | .................... | G06F 9/44589 |
| 2019/0171550 A1 * | 6/2019 | Eizenman | ........... | G06F 11/3664 |
| 2019/0207967 A1 * | 7/2019 | Vashisht | ............... | G06F 16/285 |
| 2019/0235713 A1 * | 8/2019 | Borenstein | ............ | G06F 3/0484 |
| 2019/0258771 A1 * | 8/2019 | Hook | .................... | G06F 30/392 |
| 2019/0317757 A1 * | 10/2019 | Jodoin | ...................... | G06F 8/60 |

\* cited by examiner

FIG. 7

| | X | Y | Site | Flow PF | Item PF.98 | O_PON_Vout@LI |
|---|---|---|---|---|---|---|
| 0 | 15 | 4 | 1 | P | P | 2.49971 |
| 1 | 16 | 4 | 1 | P | P | 2.49885 |
| 2 | 17 | 4 | 1 | P | P | 2.49885 |
| 3 | 18 | 4 | 1 | P | P | 2.50131 |
| 4 | 19 | 4 | 1 | P | P | 2.50008 |
| 5 | 19 | 2 | 2 | P | P | 2.50008 |
| 6 | 20 | 4 | 1 | P | P | 2.50352 |
| 7 | 20 | 2 | 2 | P | P | 2.50058 |
| 8 | 21 | 4 | 1 | P | P | 2.50302 |
| 9 | 21 | 2 | 2 | P | P | 2.50156 |
| 10 | 22 | 4 | 1 | P | P | 2.5018 |

FIG. 8

| | | | U321 | | | | |
|---|---|---|---|---|---|---|---|
| | | | FinalYield | FirstYield | RetestYield | RecoverYield | FinalPass | FirstPass |
| 0: | 6520/ | 6520-01-C0/1 | 83.7493 | 83.6912 | 1.39292 | 0.0580383 | 1443 | 1442 |
| 1: | 520/K | 520-03-E3/1 | 87.0573 | 86.9414 | 1.2188 | 0.116077 | 1500 | 1498 |
| 2: | 6520/ | 6520-03-G6/1 | 87.4057 | 87.4057 | 1.33488 | 0 | 1506 | 1506 |
| 3:K4 | 20/ | 520-04-B6/1 | 83.0528 | 83.0528 | 1.91326 | 0 | 1431 | 1431 |
| 4: | 520/K4 | -05-E1/1 | 85.2583 | 85.0842 | 1.62507 | 0.174115 | 1469 | 1466 |
| 5: | 6520/K4 | -06-G4/1 | 83.343 | 83.285 | 2.08938 | 0.0580383 | 1436 | 1435 |
| 6: | 6520/K4 | 20-07-B4/1 | 84.9681 | 84.9681 | 1.62507 | 0 | 1464 | 1464 |
| 7: | 6520/K4 | 20-08-D7/1 | 85.9547 | 85.9547 | 1.56703 | 0 | 1481 | 1481 |
| 8: | 6520/K4 | 520-09-G2/1 | 87.7539 | 87.7539 | 1.16077 | 0  U323 | 1512 | 1512 |
| 9: | 6520/K4 | 20-10-D7/1 | 89.321 | 89.2629 | 0.812536 | 0.0580383 | 1539 | 1538 |
| 10 | 6520/K | 520-11-G2/1 | 87.3476 | 87.3896 | 1.509 | 0.0580383 | 1505 | 1504 |
| 11: | 6520/ | 520-12-B2/1 | 88.1021 | 88.0441 | 1.509 | 0.0580383 | 1518 | 1517 |
| 12: | 520/ | 6520-13-D5/1 | 88.4504 | 88.4504 | 1.04469 | 0 | 1524 | 1524 |
| 13: | 520/K | 520-14-G6/1 | 90.8299 | 90.7719 | 1.16077 | 0.0580383 | 1565 | 1564 |
| 14: | 6520/K4 | 520-15-B0/1 | 85.3163 | 85.3163 | 1.45096 | 0 | 1470 | 1470 |
| 15: | 6520/K4 | 520-16-D3/1 | 87.6378 | 87.5798 | 1.2188 | 0.0580383 | 1510 | 1509 |
| 16: | 65  K4 | 520-17-F6/1 | 86.9414 | 86.8833 | 1.39292 | 0.0580383 | 1498 | 1497 |
| 17: | /K4 | 20-18-A6/1 | 87.7539 | 87.7539 | 1.04469 | 0 | 1512 | 1512 |

FIG. 10

| | | U331 | | | | | |
|---|---|---|---|---|---|---|---|
| | | TotalTime | NormalTestTime | RetestTestTime | NormalPauseTime | NormalTotalTime | RetestPauseTime |
| 0: | R719/EBR719-01-E3/1 | 37.3719 | 35.2 | 2.17187 | 0 | 35.2 | 0 |
| 1: | R719/R 8719-02-G6/1 | 37.6012 | 35.138 | 2.46318 | 0 | 35.138 | 0 |
| 2: | 719/E R719-03-86/1 | 42.6196 | 39.4624 | 3.1572 | 0 | 39.4624 | 0 |
| 3: | 719/E R719-04-E1/1 | 38.3764 | 36.7685 | 1.60785 | 0 | 36.7685 | 0 |
| 4: | 719/E R719-05-G4/1 | 37.9964 | 35.2015 | 2.79487 | 0 | 35.2015 | 0 |
| 5: | 719/E R719-06-B4/1 | 38.2172 | 35.1928 | 3.02437 | 0 | 35.1928 | 0 |
| 6: | 719/E R719-07-07/1 | 37.585 | 35.1939 | 2.39118 | 0 | 35.1939 | 0 |
| 7: | 719/E 719-08-G2/1 | 37.09 | 35.0892 | 2.00085 | 0 | 35.0892 | 0 |
| 8: | 719/E 719-09-B2/1 | 37.4662 | 35.1635 | 2.3027 | 0 | 35.1635 | 0 |
| 9: | 719/E 19-10-G2/1 | 37.3833 | 35.0434 | 2.33985 | 0 | 35.0434 | 0 |
| 10: | R719/E 719-11-82/1 | 37.2652 | 35.087 | 2.17818 | 0 | 35.087 | 0 |
| 11: | 719/E 719-12-05/1 | 36.4082 | 35.2148 | 1.19335 | 0 | 35.2148 | 0 |
| 12: | 719/E R719-13-G0/1 | 37.2539 | 35.2237 | 2.03018 | 0 | 35.2237 | 0 |
| 13: | 719/E R719-14-80/1 | 42.8876 | 40.6991 | 2.18852 | 0 | 40.6991 | 0 |
| 14: | R719/E R719-15-03/1 | 36.9644 | 35.1892 | 1.77518 | 0 | 35.1892 | 0 |
| 15: | R719/E 1719-16-F6/1 | 36.5477 | 35.1972 | 1.35052 | 0 | 35.1972 | 0 |
| 16: | R719/E 719-17-A6/1 | 36.9683 | 35.0601 | 1.90818 | 0 | 35.0601 | 0 |
| 17: | R719/E 719-18-D1/1 | 37.5515 | 35.4955 | 2.05602 | 0 | 35.4955 | 0 |

FIG. 13

| | | BinCount | BinYield | S2S Count | S2S Yield | Site1 | Site2 |
|---|---|---|---|---|---|---|---|
| 0: 'R719/ | 'R719-01-E3/1/Pass | 6007 | 98.6857 | 34 | 0.394283 | 1488 | 1512 |
| 0:E R719/ | R719-01-E3/1/hbin1 | 6007 | 98.6857 | 24 | 0.394283 | 1488 | 1512 |
| 0:( 719/f | R719-01-E3/1/hbin2 | 4 | 0.0657138 | 2 | 0.0328569 | 2 | 0 |
| 0:( 719/f | R719-01-E3/1/hbin3 | 1 | 0.0164285 | 1 | 0.0164285 | 1 | 0 |
| 0:E( :719/f | R719-01-E3/1/hbin4 | 7 | 0.114999 | 2 | 0.0328569 | 3 | 1 |
| 0:E R719/. | R719-01-E3/1/hbin5 | 3 | 0.0492854 | 3 | 0.0492854 | 3 | 0 |
| 0:E R719/ | R719-01-E3/1/hbin6 | 0 | 0 | 0 | 0 | 0 | 0 |
| 0:E R719/. | 'R719-01-E3/1/hbin8 | 0 | 0 | 0 | 0 | 0 | 0 |
| 0:E R719/ | R719-01-E3/1/hbin9 | 3 | 0.0492854 | 2 | 0.0328569 | 1 | 0 |
| 0:E R719/ | R719-01-E3/1/hbin10 | 1 | 0.0164285 | 1 | 0.0164285 | 0 | 0 |
| 0:E R719/ | R719-01-E3/1/hbin13 | 0 | 0 | 0 | 0 | 0 | 0 |
| 0:E R719/\ | R719-01-E3/1/hbin14 | 14 | 0.229998 | 6 | 0.0985707 | 3 | 3 |
| 0:( R719/ | R719-01-E3/1/hbin15 | 18 | 0.295712 | 3 | 0.0492854 | 5 | 4 |
| 0:( R719/ | R719-01-E3/1/hbin16 | 3 | 0.0492854 | 3 | 0.0492854 | 0 | 0 |
| 0:( 719/E | R719-01-E3/1/hbin18 | 2 | 0.0328569 | 2 | 0.0328569 | 0 | 0 |
| 0:E .719/\ | R719-01-E3/1/hbin19 | 8 | 0.131428 | 3 | 0.0492854 | 3 | 2 |
| 0:E (719/" | R719-01-E3/1/hbin20 | 2 | 0.0328569 | 1 | 0.0164285 | 1 | 0 |
| 0:E R719/\ | R719-01-E3/1/hbin21 | 14 | 0.229998 | 6 | 0.0985707 | 4 | 7 |

FIG. 15

| | BinCount | BinYield | S2S Count | S2S Yield | Site1 | Site2 | Site3 | Site4 | Site5 | Site6 | Site7 | Site8 | Site9 | Site10 | Site11 | Site12 |
|---|---|---|---|---|---|---|---|---|---|---|---|---|---|---|---|---|
| 0:EA9341 | | | 6 | 0.035346 | 1 | 1 | 6 | 4 | 3 | 2 | 6 | 3 | 5 | 3 | 2 | 2 |
| 0:EA9341 | 38 | 0.223859 | 6 | 0.035346 | 2 | 3 | 2 | 1 | 4 | 0 | 6 | 3 | 3 | 4 | 3 | 2 |
| 0:EA9341 | 1 | 0.005891 | 1 | 0.005891 | 0 | 0 | 0 | 0 | 0 | 0 | 0 | 1 | 0 | 0 | 0 | 0 |
| 0:EA9341 | 0 | 0 | 0 | 0 | 0 | 0 | 0 | 0 | 0 | 0 | 0 | 0 | 0 | 0 | 0 | 0 |
| 0:EA9341 | 18 | 0.106038 | 5 | 0.029455 | 0 | 0 | 0 | 1 | 5 | 1 | 1 | 1 | 2 | 0 | 1 | 1 |
| 0:EA9341 | 8 | 0.047128 | 3 | 0.017673 | 0 | 0 | 0 | 0 | 0 | 3 | 1 | 1 | 0 | 0 | 1 | 1 |
| 1:EA9341 | | | 25 | 0.147275 | 1059 | 1053 | 1055 | 1047 | 1048 | 1047 | 1048 | 1061 | 1054 | 1036 | 1051 | 1040 |
| 1:EA9341 | 16807 | 99.01031 | 25 | 0.147275 | 1059 | 1053 | 1055 | 1047 | 1048 | 1047 | 1048 | 1061 | 1054 | 1036 | 1051 | 1040 |
| 1:EA9341 | 0 | 0 | 0 | 0 | 0 | 0 | 0 | 0 | 0 | 0 | 0 | 0 | 0 | 0 | 0 | 0 |
| 1:EA9341 | 28 | 0.164948 | 7 | 0.041237 | 2 | 1 | 1 | 0 | 3 | 2 | 1 | 0 | 4 | 3 | 0 | 2 |
| 1:EA9341 | 3 | 0.017673 | 1 | 0.005891 | 0 | 0 | 0 | 0 | 0 | 0 | 1 | 1 | 0 | 0 | 0 | 0 |
| 1:EA9341 | 4 | 0.023564 | 1 | 0.005891 | 0 | 0 | 0 | 1 | 0 | 0 | 0 | 0 | 0 | 0 | 0 | 1 |
| 1:EA9341 | 4 | 0.023564 | 1 | 0.005891 | 1 | 1 | 0 | 0 | 1 | 0 | 0 | 0 | 0 | 0 | 0 | 0 |
| 1:EA9341 | 60 | 0.353461 | 8 | 0.047128 | 5 | 7 | 3 | 3 | 3 | 4 | 1 | 3 | 6 | 5 | 2 | 1 |
| 1:EA9341 | 38 | 0.223859 | 6 | 0.035346 | 1 | 6 | 2 | 3 | 2 | 2 | 2 | 3 | 3 | 2 | 0 | 2 |
| 1:EA9341 | 1 | 0.005891 | | 0.005891 | 0 | 0 | 0 | 1 | 0 | 0 | 0 | 0 | 0 | 0 | 0 | 0 |
| 1:EA9341 | 0 | 0 | 0 | 0 | 0 | 0 | 0 | 0 | 0 | 0 | 0 | 0 | 0 | 0 | 0 | 0 |
| 1:EA9341 | | | 8 | 0.047128 | 0 | 0 | 0 | 1 | 1 | 2 | 1 | 0 | 0 | 0 | 1 | 8 |
| 1:EA9341 | | | 2 | 0.011782 | 0 | 0 | 1 | 0 | 2 | 1 | 0 | 0 | 0 | 0 | 0 | 0 |
| 2:EA9341 | 12 | 0.070692 | 2 | 0.011782 | 0 | 1 | 0 | 0 | 1 | 1 | 1 | 2 | 1 | 0 | 0 | 2 |
| 2:EA9341 | 1 | 0.005891 | 1 | 0.005891 | 0 | 0 | 0 | 0 | 0 | 0 | 0 | 0 | 0 | 0 | 0 | 1 |
| 2:EA9341 | 6 | 0.035346 | 2 | 0.011782 | 1 | 0 | 0 | 2 | 1 | 0 | 0 | 0 | 1 | 0 | 0 | 0 |

IC TEST INFORMATION MANAGEMENT SYSTEM BASED ON INDUSTRIAL INTERNET

TECHNICAL FIELD

The present invention relates to the technical field of IC tests and in particular to an information management method for IC tests, and an information management system for IC tests, and a machine-readable storage medium.

BACKGROUND OF THE PRESENT INVENTION

In recent years, big data has been a very hot topic. At present, by IC tests, various types of big data of over 300 G are generated every day, and more than 200 million chips are tested every month. There are, in average, about 6000 parameters and about 10,000,000 function vectors to be tested for each chip. The test data is continuously increased.

However, it was found by the inventor(s) of the present application during the long-term research that the value of the test data generated in the IC tests has not yet been well utilized.

SUMMARY OF THE PRESENT INVENTION

A main technical problem of the present invention is to provide an information management method for IC tests, and an information management system for IC tests, and a machine-readable storage medium, which can provide technical support for utilizing the value of test data generated in IC tests.

To solve the technical problem, one technical solution is employed in the present invention. The present invention provides an information management method for IC tests. The method comprises steps of: providing test data generated by performing an IC test by an IC test platform, the IC test platform being an IC test platform having more than one stage, each stage of the IC test platform comprising a plurality of test devices; providing resource data related to the IC test, other than the test data; and analyzing the IC test according to the test data of the IC test and the resource data, to obtain result data related to the IC test.

Wherein, the IC test comprises at least one of a test in a design verification stage and a test in a production link; the test in the design verification stage comprises a wafer test; and the test in the production link comprises at least one of a process test in a wafer manufacture stage, a wafer test and a final test.

Wherein, the providing test data generated by performing an IC test by an IC test platform comprises: acquiring raw test data, in different formats, generated by performing the IC test by the IC test platform; and converting the raw test data into converted test data in a uniform format.

Wherein, the IC test is a wafer test, the test data is generated by a plurality of testers of different types and comprises test data of each of wafers, and the resource data comprises test history data of each of wafers, which corresponds to the test data of each of the wafers; wherein, the resource data further comprises basic information data of each of wafers, which corresponds to the test data of each of the wafers; wherein, the resource data further comprises a state history data of a test prober when each of the wafers is tested, which corresponds to the test data of each of the wafers; wherein, the result data comprises a yield of each tested product, the fluctuation in the yield every day, and a change tendency of key parameters; and the method further comprises automatically pushing the result data to relevant personnel; wherein, the result data is automatically pushed to relevant personnel via Email or WeChat.

Wherein, the providing resource data related to the IC test, other than the test data, comprises: establishing, managing and real-time updating a test flow for the IC test; registering and managing information about a tested product for the IC test; registering and managing information about a test device for the IC test; monitoring and managing a job state for the IC test; monitoring and managing information about a test in the production link; verifying a test UID of a tested product and a UID in a server, and recording, in real time, the result of verification and a test version number; modifying, adding and deleting information about a wafer map of a tested product for the IC test; wherein, the IC test is a test in the production link; and the IC test is a wafer test or final test in the production link.

Wherein, the analyzing comprises at least one of test parameter index analysis, test yield analysis, test time analysis, wafer map information analysis, test summary check and analysis, prober card touchdown analysis, result data feedback requirement analysis, and test history information analysis; wherein, the analyzing the IC test according to the test data of the IC test and the resource data to obtain result data related to the IC test comprises: receiving first relevant information, which is input to query resource data, the first relevant information comprising tested product name, test device, test lot and tester ID; receiving second relevant information, which is input to query resource data, the second relevant information comprising starting time and ending time; receiving third relevant information, which is input to query resource data, the third relevant information indicating that the test is a wafer test or a final test; receiving fourth relevant information, which is input to query resource data, the fourth relevant information indicating whether data in a database or local data is queried; according to the first relevant information, the second relevant information, the third relevant information and the fourth relevant information, reading a relevant file of the data, and displaying, in real time, reading progress and parameter information;

receiving analysis function information, which is input and corresponds to an actual demand, and displaying a corresponding data format;

generating the analyzed result data according to the analysis function information;

wherein, the result data is presented in at least one of files, report forms and charts;

the method further comprises:

according to the test data for the IC test, the resource data, and feedback requirements of the result data, analyzing the IC test to obtain result data which is related to the IC test and corresponds to the feedback requirements; and displaying, in at least one of files, report forms and charts, the result data on a visual interface; wherein, the result data corresponding to the test parameter index analysis comprises: a X-coordinate and a Y-coordinate, on a wafer, of each die in the wafer, a site corresponding to XY coordinates, the pass or fail result of the XY coordinates, the pass or fail result of a test item, and a specific test value of the test item; wherein, the result data corresponding to the test parameter index analysis is obtained by removing values indicating fail of a die, values indicating fail of a test item, IQR values greater than 1.5× test value, and IQR values greater than 3× test value; wherein, the result data corresponding to the test parameter index analysis is presented in a first chart; wherein, the first chart comprises a normal distribution plot, a scatter plot, a bar histogram, a box plot and a value map of the test item; wherein, marks of the first chart comprise: high limit, low limit, maximum value, minimum value, mean value, median value, standard deviation, mean value +3sigma, mean value −3sigma, first quartile and third quartile; wherein, numerical value analysis comprises mean value analysis and standard deviation analysis of numerical values; wherein, the result data corresponding to the test yield analysis comprises final yield, first yield, retest yield, recover yield, final pass number, first pass number, retest count, recover count, tester ID, and prober card ID; wherein, the result data corresponding to the test yield analysis is presented in a second chart; wherein, the second chart comprises: a rectified lot yield analysis diagram in which, values of tested products in different lots are shown in different colors, in order to analyze the difference in yield between tested product lots; a prober card yield analysis diagram in which, a test yield analysis diagram is formed according to different test conditions, in order to analyze the difference in yield between different hardware; a linear diagram of site yield analysis in which, different sites are drawn in a linear diagram, in order to analyze the difference in yield between sites; a failbin analysis diagram in which, the number of all failbins is sorted from the largest to the smallest, each test result bin is accumulated onto the previous number of all test result bins, and an accumulative percentage line is drawn, in order to analyze which test result bins cause the main fail and how much the influence is; a single-site fail analysis diagram in which, three failbins having a largest number are shown in a superimposed histogram, and the difference in yield between sites is analyzed by the height of each site; and a linear diagram of multiple sites in which, three failbins having a largest number are shown in a linear diagram, in order to analyze whether the fail number increases due to the difference in site; wherein, the result data corresponding to the test time analysis comprises: total test time, normal test time, retest test time, pause time during the normal test process, total normal test time, pause time during the retest process, total retest time, first die retest time, tester ID, and prober card ID; and the result data corresponding to the test time analysis is presented in a rectified lot yield analysis diagram in which values of different lots are shown in different colors in order to analyze the difference in test time between lots; wherein, the prober card touchdown analysis is to show the time of touchdown of each prober card; wherein, the wafer map information analysis comprises distribution of all test result bins, distribution of recover test result bins, determination as to whether the map is abnormal by a plurality of analysis algorithms, the capability of superposing a plurality of maps, and analysis of the distribution of failbins; wherein, the result data according to the wafer map information analysis comprises the number of test result bins, the percentage of test result bins, the number of site differences, the percentage of site differences, and the specific site information; wherein, the result data according to the wafer map information analysis is presented by distinguishing recover/retest in colors, by means of distinguishing recover/retest in colors, the recover yield can be analyzed and the presence or absence of obvious patterns can be determined, in order to analyze the difference between hardware, give instructions for the subsequent tests and to increase the yield; and wherein, the IC test is a test in the production link; and the IC test is a wafer test or final test in the production link.

Wherein, the method further comprises: monitoring, remotely and in real time, the IC test by a visualization technique; wherein, the monitoring, remotely and in real time, the IC test by a visualization technique comprises: monitoring, remotely and in real time, the test prober and the tester in the IC test by a visualization technique; monitoring, remotely and in real time, the data collection, data processing, data analysis and data storage in the IC test by a visualization technique; monitoring and managing, remotely and in real time, the whole process of the IC test by a visualization technique; the method further comprises: when it is found that a test workshop is abnormal, sending an alarm signal; in response to the alarm signal, processing the abnormality in the visual interface; wherein, the monitoring, remotely and in real time, the test prober by a visualization technique comprises: recording and displaying the number of continuous defective products; if the recorded number of continuous defective products is greater than an input misjudgment threshold, sending an instruction to the automatic test prober to stop the test, and also sending an alarm instruction to give an alarm; and wherein, the IC test is a test in the production link; and the IC test is a wafer test or final test in the production link.

To solve the technical problem, another technical solution is employed in the present invention. The present invention provides an information management system for IC tests, comprising a processor, a memory and a communication circuit, the processor being respectively coupled to the memory and the communication circuit, the system being connected to an IC test platform by the communication circuit to collect test data generated by performing an IC test by the IC test platform, wherein the processor, the memory and the communication circuit can implement, when in use, steps in the method described in any one of the preceding items.

Wherein, the system comprises: a device interconnection and data source fusion sub-system, comprising a processor, a memory and a communication circuit, wherein the device interconnection and data source fusion sub-system is connected to the IC test platform by the communication circuit, and the processor, the memory and the communication circuit can implement, when in use, a step of providing test data generated by performing an IC test by an IC test platform, a resource management sub-system, comprising a processor, a memory and a communication circuit, wherein the processor, the memory and the communication circuit can implement, when in use, a step of providing resource data related to the IC test, other than the test data; a data analysis sub-system, comprising a processor, a memory and a communication circuit, wherein the processor, the memory and the communication circuit can implement, when in use, a step of analyzing the IC test according to the test data of the IC test and the resource data, to obtain result data related to the IC test; and the device interconnection and data source fusion sub-system, the resource management sub-system and the data analysis sub-system are connected by the respective communication circuits.

Wherein, the device interconnection and data source fusion sub-system comprises a central server, a data pre-processing server and a first database server: the resource management sub-system comprises a second database server; the data analysis sub-system comprises an analysis server; the data pre-processing server, the first database server, the second database server, the analysis server and the testers each are connected to the central server, the second database server is further connected to the testers, the data pre-processing server is further connected to the first database server, and the analysis server is further connected to the first database server, during the test of each of wafers, corresponding test history data is stored in the second database server, the corresponding basic information data of each of the wafers is written in the second database server, and also the state history data of the test prober during the test of each of the wafers is written in the second database server, the raw test data generated by a plurality of testers of different types is stored in the central server; the central server distributes corresponding raw test data to the data pre-processing server according to the test history data of a wafer in the second database server; the data pre-processing server pre-processes the raw test data, converts the raw test data into converted test data in a uniform format, extracts key parameters, and stores the pre-processed data in the first database server: at the end of pre-processing, the central server assigns an analysis job to the analysis server, the analysis job carrying resource data which is stored in the second database server and is to be used in analysis; the analysis server acquires the pre-processed data from the first database server according to the analysis job, analyzes the pre-processed data and generates the result data, and automatically pushes the result data to relevant personnel via Email or WeChat so that the relevant personnel can know, in real time, the yield of each tested product, the fluctuation in the yield every day, and a change tendency of key parameters; wherein, the first database server is an MongoDB database server and the second database server is an SQL database server.

Wherein, the system further comprises: an unmanned-workshop industrial application sub-system, comprising a processor, a memory and a communication circuit, wherein the unmanned-workshop industrial application sub-system is connected to the IC test platform, the device interconnection and data source fusion sub-system, the resource management sub-system and the data analysis sub-system by the communication circuit, respectively, and the processor, the memory and the communication circuit can implement, when in use, the step of monitoring, remotely and in real time, the IC test by a visualization technique.

To solve the technical problem, another technical solution is employed in the present invention. The present invention provides a machine-readable storage medium storing machine executable instructions which are configured to enable a machine to perform steps in the method described in any one of the preceding items.

The present invention has the following beneficial effect. Different from that in the prior art, in the information management system and method for IC tests, on one hand, test data generated by performing an IC test by an IC test platform is provided; and on the other hand, resource data related to the IC test, other than the test data, is provided, and the IC test is analyzed according to the test data of the IC test and the resource data, to obtain result data related to the IC test. The result data utilizes not only the test data and also the resource data, and the resource data refers to all data related to the IC test, other than the test data. Therefore, according to different test demands, test stages and test purposes, different resource data can be utilized. Different analyses can be performed in combination with the test data to obtain different result data. According to different result data, together with different test demands, test stages and test purposes, the value of the test data can be flexibly and discriminatively utilized.

BRIEF DESCRIPTION OF THE DRAWINGS

To describe the technical solutions in the embodiments of the present application more clearly, the accompanying drawings to be used in the description of the embodiments will be briefly described below. Apparently, the accompanying drawings described hereinafter are some of the embodiments of the present application, and a person of ordinary skill in the art can obtain other drawings according to these drawings without paying any creative effort. In the drawings:

FIG. 7 is a schematic view of displaying parameter information in the six step;

FIG. 8 is a schematic view of displaying the specific data in the test parameter index analysis;

FIG. 10 is a schematic view of displaying the specific data;

FIG. 13 is a schematic view of displaying the specific data in time analysis;

FIG. 15 is a schematic view of distinguishing recover/retest in colors;

FIG. 17 is a schematic view of SummaryCheck;

DETAILED DESCRIPTION OF THE PRESENT INVENTION

The technical solutions in the embodiments of the present application will be clearly and completely described below with reference to the accompanying drawings in the embodiments of the present application. Apparently, the embodiments described herein are merely some but not all of the embodiments of the present application. All other embodiments obtained based on the embodiments in the present application by a person of ordinary skill in the art without paying any creative effort shall fall into the protection scope of the present application.

Figure 1:
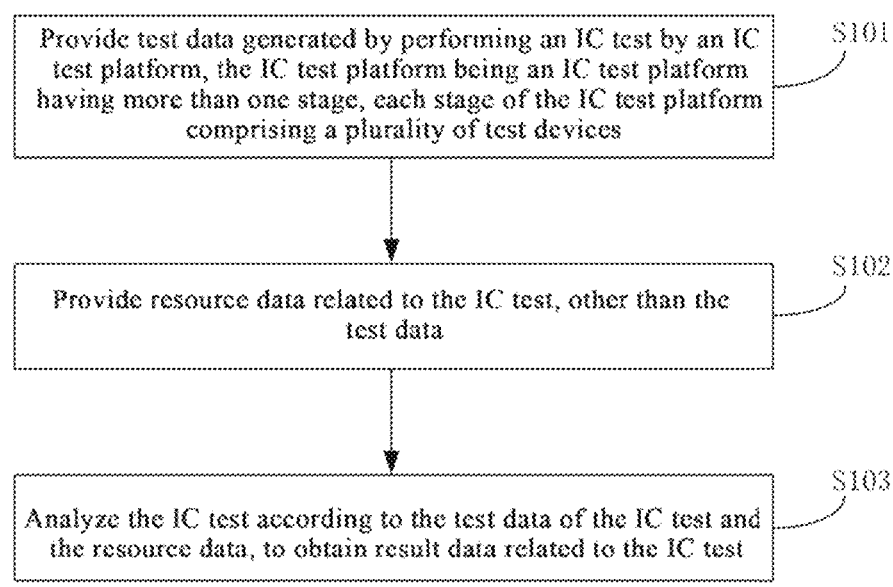
FIG. 1 is a schematic flowchart of an embodiment of an information management method for IC tests, according to the present invention.
Figure 2:
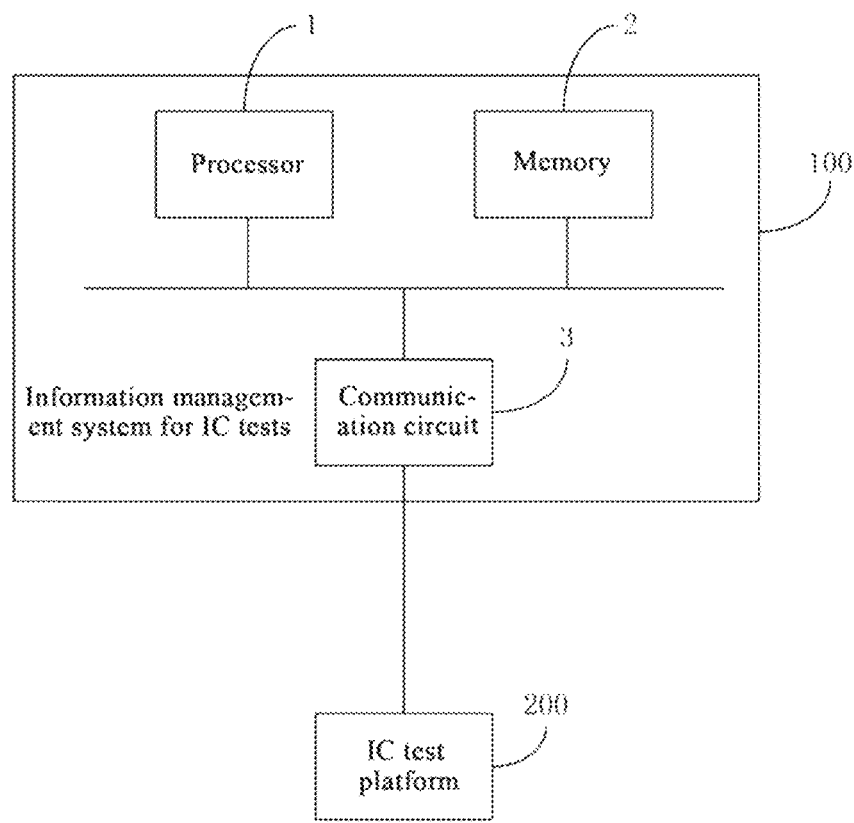
FIG. 2 is a structural diagram of an embodiment of an information management system for IC tests, according to the present invention.

Referring to both FIG. 1 and FIG. 2, FIG. 1 is a schematic flowchart of an embodiment of an information management method for IC tests according to the present invention and FIG. 2 is a structural diagram of an embodiment of an information management system for IC tests according to the present invention. The information management system provided in the embodiment of the present invention can implement the information management method provided in the embodiment of the present invention. Here, for ease of description, the information management system for IC tests and the information management method for IC tests will be described together in detail.

The information management system for IC tests 100 comprises a processor 1, a memory 2 and a communication circuit 3, the processor 1 being respectively coupled to the memory 2 and the communication circuit 3, the system 100 being connected to an IC test platform 200 by the communication circuit 3 to collect test data generated by performing an IC test by the IC test platform 200, wherein the processor 1, the memory 2 and the communication circuit 3 can implement, when in use, steps in any one of the following information management methods for IC tests.

Wherein, the information management method for IC tests comprises:

step S101: providing test data generated by performing an IC test by an IC test platform, the IC test platform being an IC test platform having more than one stage, each stage of the IC test platform comprising a plurality of test devices; step S102: providing resource data related to the IC test, other than the test data; and step S103: analyzing the IC test according to the test data of the IC test and the resource data, to obtain result data related to the IC test.

The range of the IC test platform can determine the size and amount of the test data, and can determine the size and amount of the resource data. There are many different methods to determine the range of the IC test platform, according to test purposes, test stages, or goals to be achieved by utilizing the related data of IC tests. For example, a design verification stage (development stage) and a production link stage are included. For another example, a design verification stage of a certain product by a certain company, a design verification stage of a plurality of different products by a certain company, a design verification stage of a certain product by several companies, a design verification stage of a plurality of different products by several companies, a production link stage of a plurality of product lots by a certain company, a production link stage of a plurality of product lots by several companies, etc., are included. According to different test purposes, test stages, or goals to be achieved by utilizing the related data of IC tests, the test items are different and the specific requirements on the test data and the resource data are also different. Therefore, according to different test purposes, test stages, or goals to be achieved by utilizing the related data of IC tests, the test data and the resource data may be selected for analysis, to obtain the desired result data.

The test data is data obtained by directly performing tests by a test device. The test data may be specific quantitative data (specific voltage value, current value, etc.) or qualitative data (for example, pass or fail, etc.). The resource data is data related to the IC test, which is not obtained by performing tests by a test device, for example, the basic information data (lot ID, the transfer date, time and place, the test UID, etc.), the test flow, the test device information, the test items, the test parameters, the test history, etc. The result data is obtained by analyzing the IC test according to the test data and the resource data.

For example, there are some products in many lots. After testing by the test device, the test data is qualitative: "pass" or "fail". If only the test data is analyzed, we can know how many products in those products "pass" and how many products "fail". Also, we can know the pass rate and the fail rate. If the lot (resource data) of each product in those products is recorded, by further analysis, we can know which lot a "failed" product belongs to. If not all products in this lot "fail", and if the raw material (resource data) of each product in those products is recorded, by further analysis, we can know which lot of raw material a "failed" product is produced from. Thus, it can be known that, by combining the test data with the resource data related to the test, deeper result data can be obtained. This combination is more beneficial for thoroughly understanding the problem, in order to solve the problem pertinently and efficiently.

It is to be noted that, the processor 1, the memory 2 and the communication circuit 3 in the information management system for IC tests 100 can implement, when in use, steps in the information management method. However, in practice, the specific deployment of the processor 1, the memory 2 and the communication circuit 3 needs to be determined according to the specific applications. That is, there are many specific deployments of the processor 1, the memory 2 and the communication circuit 3. The specific deployment of the information management system for IC tests 100 is not limited in the embodiment of the present invention.

Figure 3:
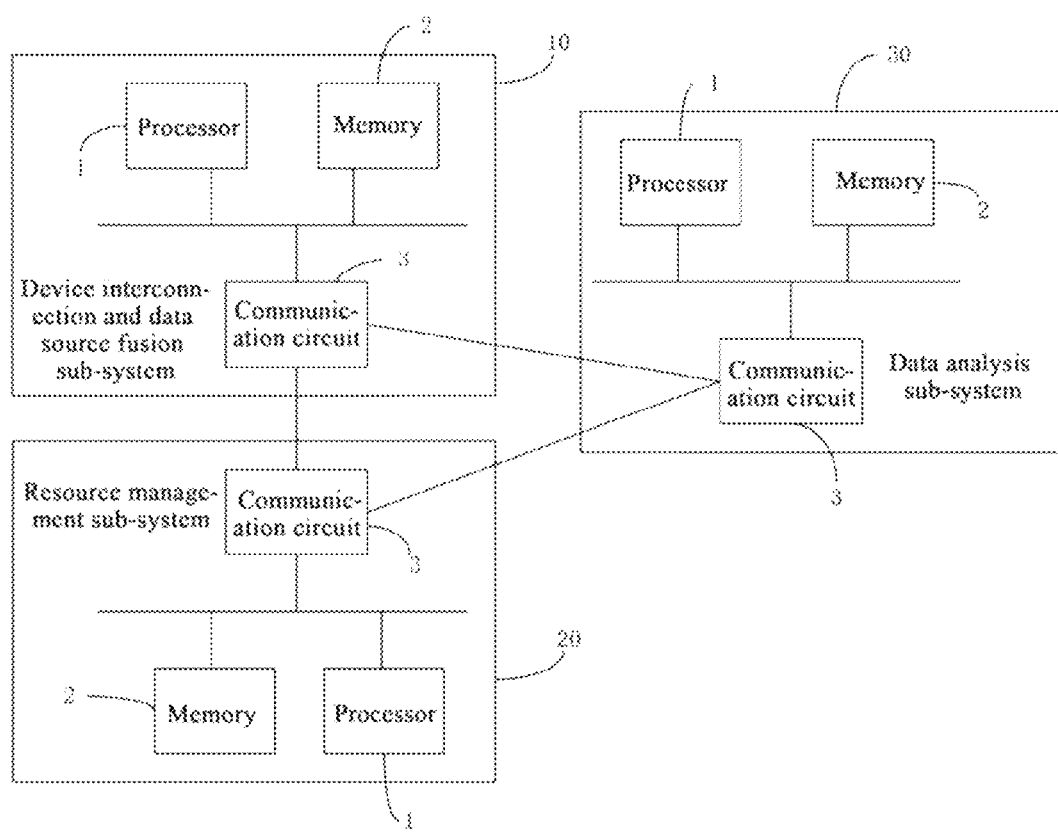
FIG. 3 is a structural diagram of another embodiment of the information management system for IC tests, according to the present invention.

Also referring to FIG. 3, in an embodiment, to be convenient for the subsequent management and update of the information management system for IC tests 100, each of the steps S101, S102 and S103 is deployed as a sub-system. That is, each sub-system can implement one step. Specifically, the information management system for IC tests 100 comprises a device interconnection and data source fusion sub-system 10, a resource management sub-system 20 and a data analysis sub-system 30. Each sub-system comprises a processor 1, a memory 2 and a communication circuit 3.

The device interconnection and data source fusion sub-system 10 is connected to the IC test platform 200 by the communication circuit 3, and its processor 1, the memory 2 and the communication circuit 3 can implement, when in use, the step S101; the processor 1, the memory 2 and the communication circuit 3 of the resource management sub-system 20 can implement, when in use, the step S102; the processor 1, the memory 2 and the communication circuit 3 of the data analysis sub-system 30 can implement, when in use, the step S103; and the device interconnection and data source fusion sub-system 10, the resource management sub-system 20 and the data analysis sub-system 30 are connected by respective communication circuits 3.

Specifically, the device interconnection and data source fusion sub-system 10, by using the tester device in the IC test platform and starting from the bottom layer, integrates the user interface (UI) with the data source and integrates the complex and diverse test data generated in IC tests. The device interconnection and data source fusion sub-system 10 enables the test device to generate raw test data by an improved operator interface (OI), and performs all pre-processing in cloud by operating and screening. The resource management sub-system 20 performs resource information fusion and system function upgrade, and manages and updates the test flow automatically and in real time. The data analysis sub-system 30 can finally obtain the result data according to the test data and the resource data by IC full-eco-chain intelligent test and analysis, for example, final yield, first yield, retest yield and recover yield (shown in grid tables and in visual manner), test time, wafer map, etc.

In the information management system and method for IC tests in the embodiment of the present invention, on one hand, test data generated by performing an IC test by an IC test platform is provided; and on the other hand, resource data related to the IC test, other than the test data is provided, and the IC test is analyzed according to the test data of the IC test and the resource data, to obtain result data related to the IC test. The result data utilizes not only the test data and also the resource data, and the resource data refers to all data related to the IC test, other than the test data. Therefore, according to different test demands, test stages and test purposes, different resource data can be utilized. Different analyses can be performed in combination with the test data to obtain different result data. According to different result data, together with different test demands, test stages and test purposes, the value of the test data can be flexibly and discriminatively utilized.

Wherein, the IC test comprises at least one of a test in a design validation stage and a test in a production link; the test in the design validation stage comprises a wafer test; and the test in the production link comprises at least one of a process test in a wafer manufacture stage, a wafer test and a final test.

In an embodiment, if the raw test data generated by the IC test platform is different in format, to be convenient for the subsequent processing, it is necessary to pre-process the raw test data. That is, the step S101 can specifically comprise: acquiring raw test data, in different formats, generated by performing the IC test by the IC test platform; and converting the raw test data into converted test data in a uniform format. If the raw test data generated by the IC test platform is the same in format and meets the requirement on the data format for analysis, this step can be omitted.

Wherein, the IC test is a wafer test, and the test data is generated by a plurality of testers of different types and comprises test data of each of wafers. When the wafer test is a small-scale test, for example a wafer test in the development validation stage, or when the result data is not so required, for example, the result data is not so required in a production process test, there may be few data as the resource data and correspondingly there may be few result data. For example, in an embodiment, the resource data comprises test history data of each of wafers, which corresponds to the test data of each of the wafers. The resource data further comprises basic information data of each of wafers, which corresponds to the test data of each of the wafers. The resource data further comprises a state history data of a test prober when each of the wafers is tested, which corresponds to the test data of each of the wafers. Wherein, the result data comprises a yield of each tested product, the fluctuation in the yield every day, and a change tendency of key parameters. Further, the information management method further comprises automatically pushing the result data to relevant personnel, wherein the result data is automatically pushed to relevant personnel via Email or WeChat.

Correspondingly, the above methods can be implemented by the three sub-systems of the information management system for IC tests. The information management system for IC tests can be further specifically deployed. When the wafer test is a small-scale test, or when the result data is not so required, the three sub-systems can be deployed simply.

Figure 4:
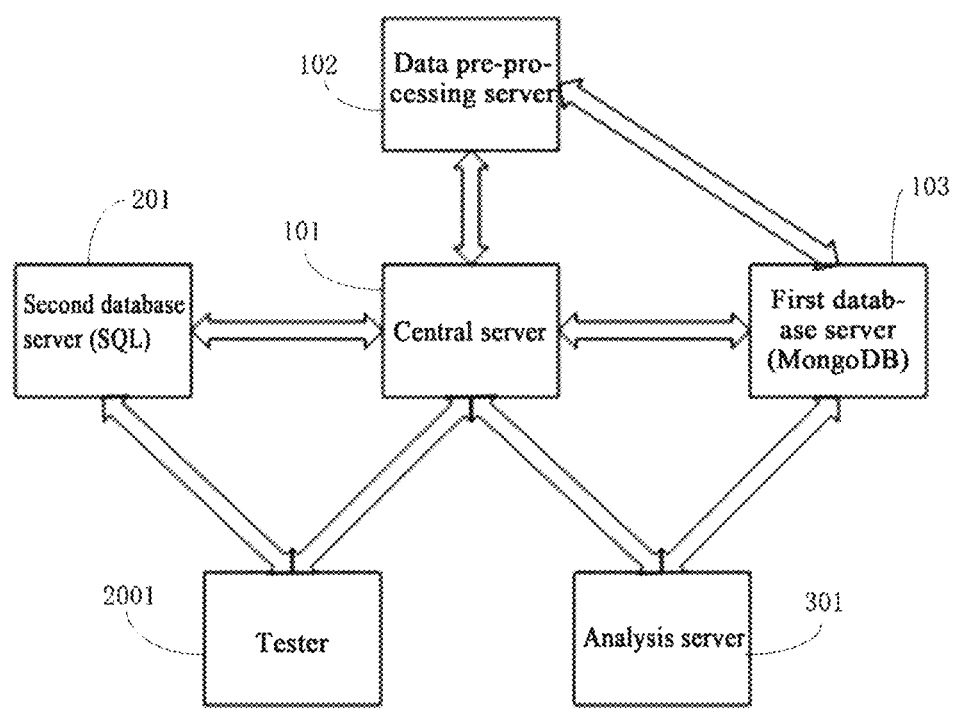
FIG. 4 is a structural diagram of another embodiment of the information management system for IC tests, according to the present invention.

For example, referring to FIG. 4, in an embodiment, the device interconnection and data source fusion sub-system 10 comprises a central server 101, a data pre-processing server 102 and a first database server 103; the resource management sub-system 20 comprises a second database server 201; the data analysis sub-system 30 comprises an analysis server 301; the data pre-processing server 102, the first database server 103, the second database server 201, the analysis server 301 and the testers 2001 each are connected to the central server 101, the second database server 201 is further connected to the testers 2001, the data pre-processing server 102 is further connected to the first database server 103, and the analysis server 301 is further connected to the first database server 103.

During the test of each of wafers, corresponding test history data is stored in the second database server 201, the corresponding basic information data of each of the wafers is written in the second database server, and also the state history data of the test prober during the test of each of the wafers is written in the second database server, the raw test data generated by a plurality of testers of different types is stored in the central server 101; the central server 101 distributes corresponding raw test data to the data pre-processing server 102 according to the test history data of a wafer in the second database server 201; the data pre-processing server 102 pre-processes the raw test data, converts the raw test data into converted test data in a uniform format, extracts key parameters, and stores the pre-processed data in the first database server 103; at the end of pre-processing, the central server 101 assigns an analysis job to the analysis server 301, the analysis job carrying resource data which is stored in the second database server and is to be used in analysis; the analysis server 201 acquires the pre-processed data from the first database server 103 according to the analysis job, analyzes the pre-processed data and generates the result data, and automatically pushes the result data to relevant personnel via Email or WeChat so that the relevant personnel can know, in real time, the yield of each tested product, the fluctuation in the yield every day, and a change tendency of key parameters; Wherein, the first database server 103 is an MongoDB database server and the second database server 201 is an SQL database server.

Specifically, 1) the raw test data contains, but is not limited to, raw data (RawData) and standard test data format (STDF) which is not related to the test system. At the start and stop of the test of each wafer, the necessary basic information of the wafer is stored in the second database server 201 (SQL server), which is to be used by the central server 101 to query the wafer test history. In addition, at the start and stop of the test of each wafer, it is necessary to write the basic information of the wafer in the second database server 201 (SQL server) through an operator interface (OI), including the product name of the wafer, lot ID, wafer No., test start time, test stop time, the used tester, the test prober, the prober card (ProberCard), etc., in order to perform rapid analysis of the wafer when no detailed data analysis is needed. Meanwhile, it is also necessary to record the state of the test prober in the second database server 201 (SQL server), in order to monitor the test environment.

2) After the test data is generated, the test data is stored in the central server 101. The central server 101 distributes a data processing job to the data pre-processing server 102 and the analysis server 301 according to the test history data of the wafer in the second database server 201 (SQL server). After the data pre-processing server 102 pre-processes the data, the pre-processed data is stored in the first database server 103 (MongoDB), to be convenient for the analysis server 103 to subsequently generate a report form of the result data. Wherein, the data pre-processing server 102 and the analysis server 301 can be implemented by a plurality of servers. The working loads are dynamically assigned according to the data and the intensity of the analysis and processing job. The first database server 103 (MongoDB) is configured to record the pre-processed data. It is a database based on distributed file storage, and falls in between a relational database and a non-relational database. It is used to store values of key parameters of all dice. When the key parameters are changed, it is unnecessary to generate a form record, and instead, new parameters are directly included in a same database form as new key parameters.

3) After the test data is pre-processed, the pre-processed data is stored in the first database server 103 (MongoDB). The pre-processed data includes, but is not limited to, the wafer map (WaferMap) and detailed data of key parameters of all dice. The data pre-processing server 102 is assigned with a data processing job by the central server 101. Since the attention is paid to different parameters for different products, the pre-processed data is also different. The data is processed by "master control+script" (the master control refers to algorithms integrated in the test software interface, and the script is an additional optimization program which, not integrated in the software, can be called). Different processing scripts are used for different products. The key parameters of the product to be processed are listed in the product processing script, and extracted and stored in the first database server 103 (MongoDB).

4) After pre-processing the data, the central server 101 sends an analysis job to the analysis server 301. The analysis server 301 acquires the pre-processed data from the first database server 103 (MongoDB) according to the analysis job assigned by the central server 101, analyzes the pre-processed data and generates an analysis report form corresponding to the result data. Then, the system automatically pushes the analysis report form to product-relevant engineers or other users via Email or WeChat so that they can know, in real time, the yield of each tested product, the fluctuation in the yield every day, and a change tendency of key parameters.

Figure 5:
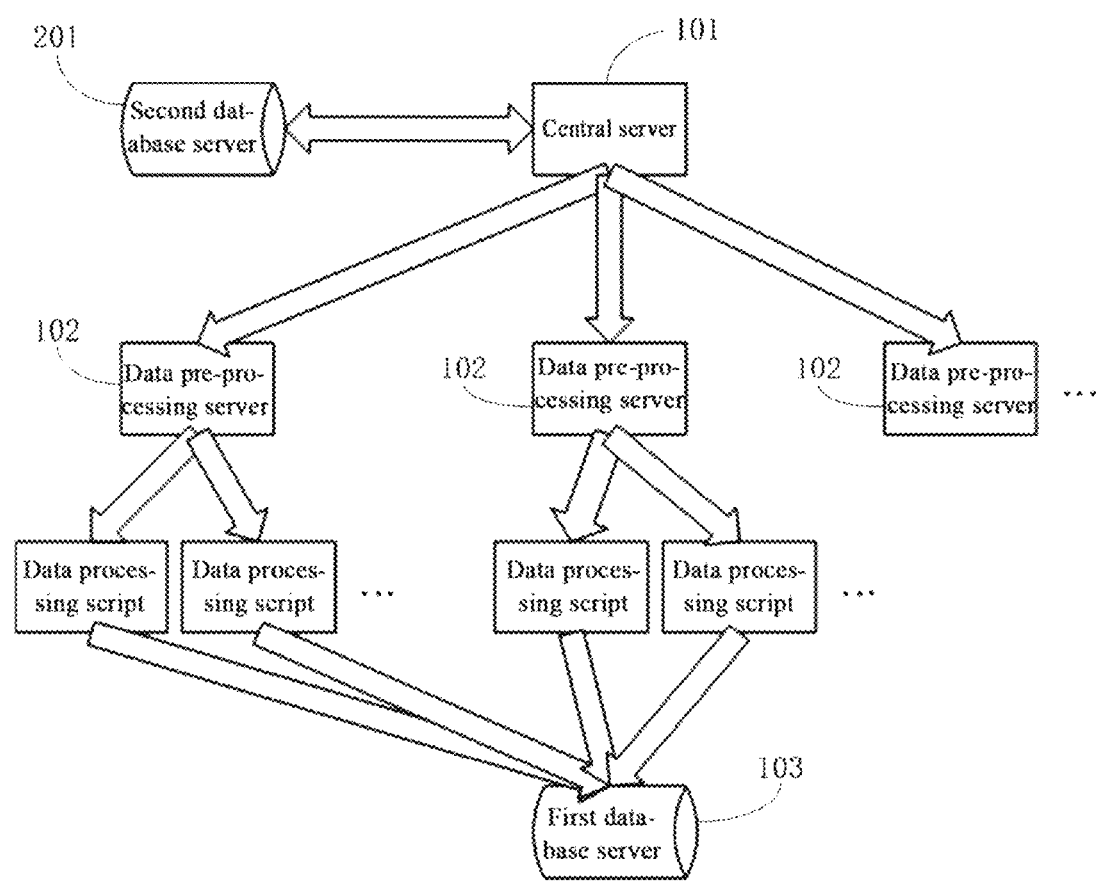
FIG. 5 is a structural diagram of another embodiment of the information management system for IC tests, according to the present invention.

If the number of products is increased, it is just needed to increase the data processing scripts or report form processing scripts. If the number of test data is increased and when the existing data pre-processing servers 102 cannot meet the demand, the operational capability can be enhanced simply by increasing the number of the data pre-processing servers 102 and the first database servers 103 (MongoDB), as shown in FIG. 5.

In the embodiment of the present invention, by the central server, the data pre-processing server, the analysis server, the second database server (SQL server) and the first database server (MongoDB), the IC test data sources generated by the multi-stage IC test platform consisting of various advanced large-scale automatic test devices are integrated. The raw test data generated by the test devices of different types is converted into converted test data in a uniform format, as the data sources. The test data contains raw data (RawData) and detailed data in the standard test data format (STDF). At the start and stop of the test of each wafer, it is necessary to write the necessary basic information of the wafer in the second database server (SQL server), to be convenient for the central server to query the test analysis report of the wafer and push it to the user in real time.

Wherein, the IC test is a test in the production link; and the IC test is a wafer test or final test in the production link. The step S102 may specifically comprise: establishing, managing and real-time updating a test flow for the IC test; registering and managing information about a tested product for the IC test; registering and managing information about a test device for the IC test; monitoring and managing a job state for the IC test; monitoring and managing information about a test in the production link; verifying a test UID of a tested product and an UID in a server, and recording, in real time, the result of verification and a test version number; and modifying, adding and deleting information about a wafer map of a tested product for the IC test.

Corresponding, the method can be implemented by the resource management sub-system 20. According to the need of practical applications, and also in order to make the resource management sub-system 20 to meet flexible demands, the resource management sub-system 20 can be deployed complexly. In practical applications, related functions of the resource management sub-system 20 and the resource data provided by the resource management sub-system 20 can be used selectively. For example, the resource management sub-system 20 can be divided into several functional modules each correspondingly implementing a specific step in the step S102.

Figure 6:
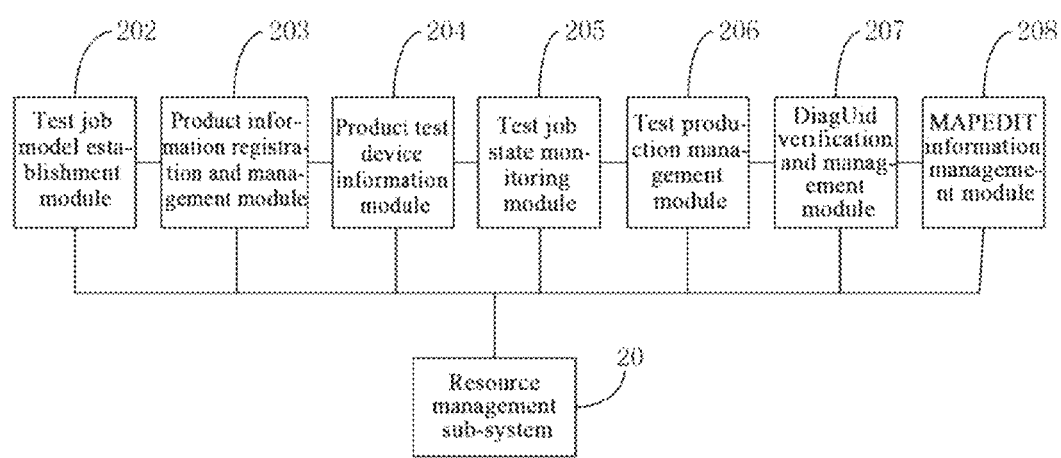
FIG. 6 is a structural diagram of another embodiment of the information management system for IC tests, according to the present invention.

Specifically, referring to FIG. 6, the resource management sub-system 20 comprises a test job model establishment module 202, a product information registration and management module 203, a product test device information module 204, a test job state monitoring module 205, a test production management module 206, a DiagUid verification and management module 207 and a map edit (MAPEDIT) information management module 208.

Test job model establishment module 202 is configured to establish, manage and real-time update a test flow for the IC test; the product information registration and management module 203 is configured to register and manage information about a tested product for the IC test; the product test device information module 204 is configured to register and manage information about a test device for the IC test; the test job state monitoring module 205 is configured to monitor and manage a job state for the IC test; the test production management module 206 is configured to monitor and manage information about a test in the production link; the DiagUid verification and management module 207 is configured to verify a test UID of a tested product and an UID in a server, and record, in real time, the result of verification and a test version number; and the map edit (MAPEDIT) information management module 208 is configured to modify, add and delete information about a wafer map of a tested product for the IC test.

The specific functions of each module will be described below in detail.

(1) Establishment of a Test Job Model

Models are established for key flows such as "test", "quality", "baking", "ink" as well as devices, accessories, test prober cards and positions, and may be configured and modified flexibly. The main feature lies in that, before the product is tested, a unique traceable linked ID. The ID will be the unique information about the product during the whole test flow, including consumed material, flow, collected parameterized data, storage/delivery, and transfer date, time and place, etc.

(2) Automatic Acquisition of the Test Flow

A test flow model is established. The job states are managed, such as online high/low temperature test, ink, baking, quality inspection and aging. The setting file is called according to the "product name". The setting file may be called for a flow that requires processing.

(3) Registration of Information about the Tested Product

According to the information about the tested product and the test requirements, the information about the tested product is registered and stored in advance. The information can be used whenever the product list is to be called. It is to be noted that the product name is the only item that cannot be repeated, including the tested product name, the test device name, the test program name and the test prober card name. In this way, basic data can be provided for the paperless operation during the whole test process. The paperless information can be automatically acquired, tracked and monitored.

(4) Management of Information about the Product Test Device

There are three types of information about the test device: "test prober", "tester" and "process engineer (PE)". Any test device may become an affiliated device of another device. That is, the ID of the affiliated device is filled in "master ID", and then shown in the process engineer-specific version of the device list.

(5) Monitoring of the Test Job State

The setting file is called according to the "product name". The setting file may be called for a flow that requires processing tests. In default, the number of the job book products is the registered number of the incoming products. The system supports temporary change, addition and deletion. The information can be automatically modified and updated in the system.

Meanwhile, the system supports updating the test job and the test program. Additionally, in order to ensure the safety of the industrial tests, a safety mechanism is provided in the system. The test job number is unique. That is, one test job book number only corresponds to a unique test program, test flow, test device information, etc.

(6) Management of the Test Production

That is, the current test flow state of the product is managed, including the flow card number, the job book number, the incoming time, the state runtime, etc., in order to realize the management of the test production.

(7) DiagUid Verification and Management

This module is applied during the rectification of the IC test. It is safe, unique and traceable. The system verifies the UID of the tested product and the UID in the server, and records, in real time, the test version number and the verification result. In this way, the correctness of the validation flow is verified. The main verification information contains: the total number of test result bins, the comparison of difference between sites, the number of dice overkill at each site, the number of dice tested at each site, the total number of dice tested, etc. The uniqueness of each test is ensured by multi-dimensional verification and validation.

The test algorithm is as follows:

It is determined whether the UID meets the requirements:

```
protected void Button1...Click(object sender, Event Args e)
{ArrayList datalog = new ArrayList( );
DataSet IE = new DataSet( ):
record ONE = new record( ):
string text = TextBox1.Text:
int AC = 0:
for (int j = 0: j < text.Length: j++)
{
   if (Regex.IsMatch(text[j].ToString( ), @"("[0-9a-zA-Z]+$)+"))
      AC = 1:
   else
      AC = 0:
   if (AC != 1)
   {
      Response Write ("<script>alert('输入的UID不合法,请确认正确性')</script>"):
      break:
   }
}
string text2 = TextBox2.Text:
int AD = 0:
for (int v = 0: v < text2.Length: v++)
{
   if (Regex.IsMatch(text2.[v].ToString( ), @"("[0-9a-zA-Z]+$)+"))
      AD = 1:
   else
      AD = 0;
   if (AD != 1)
   {
      Response.Write("<script>alert('输入的UID不合法,请确认正确性')</script>"):
      break:
   }
}
long nui = Convert.ToInt64(text, 16):
long nui2 = Convert.ToInt64(text2, 16):
if (nui > nui2)
The DiagUid verification contains the following information:
public class CalculateSummaryByTsk
{
   public int[,] SummaryBerBinSite { get: set: } //1024 Bin, 256 Site
   public int[ ] SummaryPerBin { get: set: }//每个bin合计数
   public int[ ] DifferenceBySite { get: set: }//每个Site差异数
   public int[ ] OverKillBySite { get: set: }//每个Site误测管芯
   public int[ ] SummaryPerSite { get: set: }//每个site管芯总数
   public int TestedDice { get: set: }//总测试管芯数
   public int ActualMaxSite { get: set: }
   public int ActualMaxCategory { get: set: }
   private void _initParameter( )
   {
```

```
    SummaryPerBinSite = new int[1024, 256]://1024 Bin, 256 Site
    SummaryPerBin = new int[1024]:// 每个 bin 合计数
    DifferenceBySite = new int[1024]:// 每个 bin Site 差异数
    SummaryPerSite = new int[256]:// 每个 site 管芯总数
    OverkillBySite = new int[256]:// 每个 Site 误测管芯
    TestedDice = 0://总翻试管芯数
    ActualMaxSite = 0:
    ActualMaxCategory = 0:
}
```

(8) MAPEDIT Information Management and Online Automatic Verification and Validation The MAPEDIT information management mainly refers to management of more than one hundred pieces of information, such as coordinates (X,Y) of each tested die, pass, fail. It contains more than one hundred pieces of information such as lot ID, part type, job name, tester type, setup time, start time, operator name, sublot ID, test code, job rev, executive type, exec version, test temperature, flow ID. Meanwhile, online automatic verification and validation are performed.

Additionally, during the test of the IC wafer, the final yield test result may do not match with the actual, due to some uncontrollable reasons, for example, the actual test range is different from the preset range, the input information about the operator is different from the actual information, the parameters of the device are abnormal, or the like. In order to avoid such cases, the detailed parameters of the test system (TestSystemPLUS) must be comprehensively verified and validated before uploading the data to the dater center. Before the validation, the system will automatically acquire information about the tested product, and perform corresponding rule setting and configuration. Specifically, the test range required by the customer is imported into the system by a basic map (i.e., a test yield distribution diagram by which an ideal state can be realized), the test items are imported into the system by a building distribution frame (BDF) software module, information about the used test prober card is imported into the system by prober card release (ProberCard Release, i.e., the number of release of the prober card, which may influence the test result), and finally, the information verification and validation are performed.

```
public ConvertToThumbnail(TskMapClass tskFile)
{
    try
    {
        System.Drawing.Color _passColor = System.Drawing.Color.Green:
        System.Drawing.Color _failColor = System.Drawing.Color.Red:
        System.Drawing.Color _markColor = System.Drawing.Color.Yellow:
        System.Drawing.Color _noTestColor = System.Drawing.Color.Blue:
        System.Drawing.Color _otherColor = System.Drawing.Color.White:
        ThumbnailMap = now Bitmap(tskFile.MapDataAreaRowSize,
tskFile.MapDataAreaLineSize):
        if (!tskFile.IsCorrectTskFile)
        {
            return:
        }
        int iCount = 0:
        for (int i = 0: i < tskFile.MapDataAreaLineSize: i++)
            for (int j = 0: j < tskFile.MapDataAreaRowSize: j++)
            {
                if (tskFile.MapVersion == 1)
                {
                    int iDieTestResult =
```

```
tskFile.ListTestResultPerDieFor250000Chips[icount].DieTestResult:
                        if (iDieTestResult == 0)
                            ThumbnailMap.SetPixel (j, i, _noTestColor):
                        else if (iDieTestResult == 1)
                            ThumbnailMap.SetPixel (j, i, _passColor):
                        else if ((iDieTestResult == 2) | | (iDieTestResult == 3))
                            ThumbnailMap.SetPixel (j, i, _failColor):
                        else
                            ThumbnailMap.SetPixel (j, i, _noTestColor):
}
```

After the system is verified, according to the test requirements, intelligent allocation and decision are performed, the test is started, information in the test data collection area is integrated, and the test data is monitored in real time and uploaded to the server. In this way, the information management is realized.

Wherein, the IC test is a test in the production link; and the IC test is a wafer test or final test in the production link.

The resource management sub-system in the embodiment of the present invention integrates the whole information registration and management process from storage to delivery. It is fully-functional, practical and simple, and controllable in the process, and it supports access control by a safe online remote means. It is a modular, visual, perfect and standard resource management sub-system. The functions of the resource management sub-system comprise the registration and management of the whole IC test information, including: design of test flows, registration of products, calling of test programs, calling of devices, management of prober cards, selection of test devices, registration of incoming products, assignment of test jobs, management of test flow cards, tracking of the production process, progress query, DiagUid, automatic update, mapedit, map data statistics, password modification, detection of the test map offset.

Wherein, the analyzing comprises at least one of test parameter index analysis, test yield analysis, test time analysis, wafer map information analysis, test summary check and analysis, prober card touchdown analysis, result data feedback requirement analysis, and test history information analysis.

Wherein, the step S103 may specifically comprise: receiving first relevant information, which is input to query resource data, the first relevant information comprising tested product name, test device, test lot and tester ID; receiving second relevant information, which is input to query resource data, the second relevant information comprising starting time and ending time; receiving third relevant information, which is input to query resource data, the third relevant information indicating that the test is a wafer test or a final test; receiving fourth relevant information, which is input to query resource data, the fourth relevant information indicating whether data in a database or local data is queried; according to the first relevant information, the second relevant information, the third relevant information and the fourth relevant information, reading a relevant file of the data, and displaying, in real time, reading progress and parameter information; receiving analysis function information, which is input and corresponds to an actual demand, and displaying a corresponding data format; and generating the analyzed result data according to the analysis function information. Wherein, the result data is presented in at least one of files, report forms and charts.

The method further comprises: according to the test data for the IC test, the resource data, and feedback requirements of the result data, analyzing the IC test to obtain result data which is related to the IC test and corresponds to the feedback requirements; and displaying, in at least one of files, report forms and charts, the result data on a visual interface.

Wherein, the result data corresponding to the test parameter index analysis comprises: a X-coordinate and a Y-coordinate, on a wafer, of each die in the wafer, a site corresponding to XY coordinates, the pass or fail result of the XY coordinates, the pass or fail result of a test item, and a specific test value of the test item.

Wherein, the result data corresponding to the test parameter index analysis is obtained by removing values indicating fail of a die, values indicating fail of a test item, IQR values greater than 1.5× test value, and IQR values greater than 3× test value.

Wherein, the result data corresponding to the test parameter index analysis is presented in a first chart.

Wherein, the first chart comprises a normal distribution plot, a scatter plot, a bar histogram, a box plot and a value map of the test item; marks of the first chart comprise: high limit, low limit, maximum value, minimum value, mean value, median value, standard deviation, mean value +3sigma, mean value −3sigma, first quartile and third quartile; and numerical value analysis comprises mean value analysis and standard deviation analysis of numerical values.

Wherein, the result data corresponding to the test yield analysis comprises final yield, first yield, retest yield, recover yield, final pass number, first pass number, retest count, recover count, tester ID, and prober card ID; the result data corresponding to the test yield analysis is presented in a second chart; the second chart comprises: a rectified lot yield analysis diagram in which, values of tested products in different lots are shown in different colors, in order to analyze the difference in yield between tested product lots; a prober card yield analysis diagram in which, a test yield analysis diagram is formed according to different test conditions, in order to analyze the difference in yield between different hardware; a linear site yield analysis diagram in which, different sites are drawn in a linear diagram, in order to analyze the difference in yield between sites; a failbin analysis diagram in which, the number of all failbins is sorted from the largest to the smallest, each test result bin is accumulated onto the previous number of all test result bins, and an accumulative percentage line is drawn, in order to analyze which test result bins cause the main fail and how much the influence is; a single-site fail analysis diagram in which, three failbins having a largest number are shown in a superimposed histogram, and the difference in yield between sites is analyzed by the height of each site; and a multi-site linear diagram in which, three failbins having a largest number are shown in a linear diagram, in order to analyze whether the fail number increases due to the difference in site.

Wherein, the result data corresponding to the test time analysis comprises: total test time, normal test time, retest test time, pause time during the normal test process, total normal test time, pause time during the retest process, total retest time, first die retest time, tester ID, and prober card ID; and the result data corresponding to the test time analysis is presented in a rectified lot yield analysis diagram in which values of different lots are shown in different colors in order to analyze the difference in test time between lots.

Wherein, the prober card touchdown analysis is to show the time of touchdown of each prober card.

Wherein, the wafer map information analysis comprises distribution of all test result bins, distribution of recover test result bins, determination as to whether the map is abnormal by a plurality of analysis algorithms, the capability of superposing a plurality of maps, and analysis of the distribution of failbins; the result data according to the wafer map information analysis comprises the number of test result bins, the percentage of test result bins, the number of site differences, the percentage of site differences, and the specific site information; and the result data according to the wafer map information analysis is presented by distinguishing recover/retest in colors, by means of distinguishing recover/retest in colors, the recover yield can be analyzed and the presence or absence of obvious patterns can be determined, in order to analyze the difference between hardware, give instructions for the subsequent tests and to increase the yield.

Wherein, the IC test is a test in the production link; and the IC test is a wafer test or final test in the production link.

Correspondingly, the above methods can be implemented by the data analysis sub-system 30. The data analysis sub-system 30 of the information management system for IC tests comprises the following specific functions.

The data analysis sub-system 30 comprises: a data collection layer, mainly configured to acquire test data and resource data from the device interconnection and data source fusion sub-system 10 and the resource management sub-system 20; a big data processing and analysis layer, mainly configured to analyze and process the acquired test data and resource data: and an application layer, mainly configured to utilize the result data obtained by the analysis and processing. In general, the data analysis sub-system 30 provides IC test parameter index analysis, wafer test yield analysis, test time analysis, wafer map information analysis, test summary check (SummaryCheck) and analysis, prober card touchdown analysis, report, and test history (SQLHistory) analysis.

The sub-systems of the information management system for IC tests support data interchange and data backup, and are thus high in security. The data analysis sub-system 30 can realize data retrieval, tracking and analysis for the full-eco-chain information. This facilitates the subsequent real-time monitoring of the test result.

In a specific application, the data analysis sub-system 30 comprises the following specific flows:

In a first step, the product name, test device, test lot, tester number and other information values are entered in R1, which is null in default. That is, full search is performed.

In a second step, a desired starting time and ending time are selected in R3. In default, the starting time is 30 days before the tool is opened, and in default, the ending time is the time when the tool is opened.

In a third step, a wafer test (CP) or a final test (FT) is selected in R4. This selection is related to the database for searching.

In a fourth step, in R5, a decision is made as to whether to use data in the database or local data. All information meeting certain conditions will be displayed in L1. Finally, a decision is made about which data is to be read according to the actual requirements, and the temp file or csv file is read. There are following main methods for data query: "SQL Search": query the temp file in the SQL database; "SQL Read": read the temp file in the SQL database; "SQL DC Parameter": read the temp file in the csv database; "Local Search": acquire the temp file in the local drive; "Local Read": read the temp file in the local drive; and "Local DC Parameter": read the csv file in the local drive.

In a fifth step, the progress of the file, which is being read, will be displayed in R5, and the file will be displayed in R7 after it is completely read. The read number and the progress will be displayed in real time.

In a sixth step, if the file read is a CSV file, all parameter information will be displayed in L1, specifically including:

L11: TC: the total number of tests; RC: the number of retests; and WC: the total number of tests-the number of retests.

L12: Product name. There may be a plurality of product names.

L13: Lot name under a given product name.

L14: WaferID and FlowID under a lot name under a given product name.

L15: Lot statistics information under a product name; LC: the number of lots: TC: the total number of tests of this product; RC: the number of retests of this product; and WC: the total number of tests of this product-the number of retests of this product.

L16: Statistics information of a given lot; TC: the total number of tests of this lot; RC: the number of retests of this lot; and WC: the total number of tests of this lot-the number of retests of this lot.

L17: Test ending time of a given WaferID.

Figure 7:
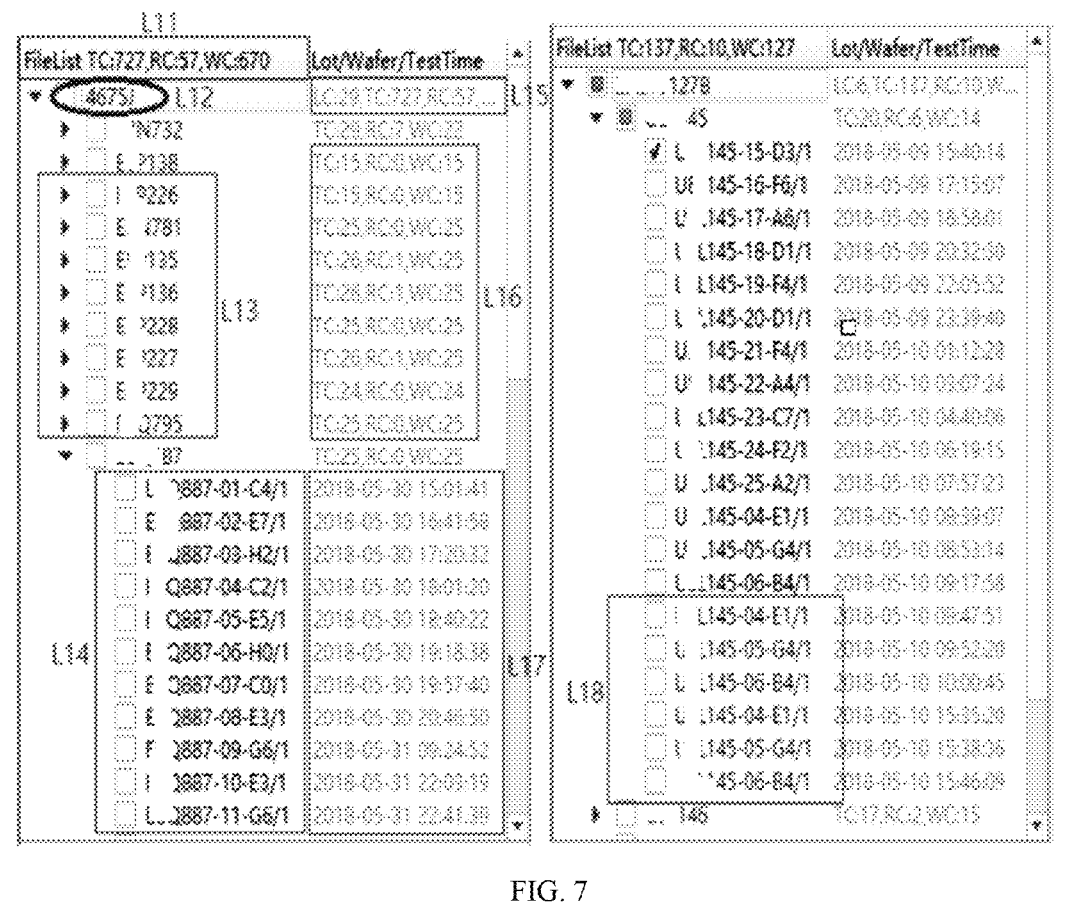

L18: As shown in FIG. 7, data of retests.

In a seventh step, special function buttons are selected in UI, and different data formats are displayed in C1 for different functions. The following main functions are included: "test parameter index analysis", mainly configured to analyze the specific index of the DC parameter; "yield analysis", mainly configured to analyze the yield information of the wafer or FT file and the specific site and bin information; "time analysis", mainly configured to analyze the test time information of the wafer or FT file and the touchdown information; "TskMap", mainly configured to view the map information of the wafer and various map-related check functions; "SummaryCheck", mainly configured to analyze the number of actual touchdown and the number of site tests of a complete wafer, "Report", mainly configured to generate different report forms for different customers; and "SQLHistory", mainly configured to view information in the SQL database, including the CP test history, the FT test history, etc.

In an eighth step, corresponding functions are selected in U1 according to actual requirements to generate new analysis data.

In a ninth step, different tabs in C1 can be selected to realize the display in multiple terminals, such as pushing via WeChat, pushing via Email, save locally.

The special functions will be specifically described below.

(1) Test Parameter Index Analysis

Data integration: U311: X, Y, Site and FlowPF are fixed columns, XY represents its XY-coordinate on a wafer, Site represents a site corresponding to this coordinate, and FlowPF represents the pass or fial of this coordinate. Different data will be correspondingly displayed in the rest columns according to different selected test items. There are two columns for one test item. The first column shows the pass/fail result for the test item, and the second column shows a specific test value for the test item.

U312: The number of pieces of row information corresponds to the number of dies to be tested in the wafer.

U313: The specific data is displayed, as shown in FIG. 8.

Settings: Remove FlowFail: remove values indicating fail of this die;

Remove ItemFail: remove values indicating fail of this test item;

Remove Outliers: remove IQR values greater than 1.5× test value;

Remove ExOutliers: remove IQR values greater than 3× test value;

By Site: whether to calculate by sites during the statistics, wherein values greater than 1.5× preset value are offline values, and values greater than 3× preset value are limit offline values; the IQR value, which indicates the degree of dispersion in statistics, is a difference between a value in the third quartile and a value in the first quartile, which are obtained by arraying various variable values in order and then dividing the sequence into four equal parts; the IQR value of test values is a difference between a value in the third quartile and a value in the first quartile, which are obtained by arraying various test values in order and then dividing the sequence into four equal parts; the difference reflects the degree of dispersion of 50% middle data; and, a less difference indicates that the middle data are more concentrated, and a greater difference indicates that the middle data are more dispersed.

The supported charts:

NormalDistribution: normal distribution plot;

ScatterPlot: scatter plot

BarHistogram: bar histogram

BoxPlot: box plot

ValueMap: map of the test item.

Marks of charts:

HighLimit: high limit

LowLimit: low limit

Max: maximum value

Min: minimum value

Mean: mean value

Median: median value

Sigma: standard deviation

+3Sigma: mean value +3sigma

−3Sigma: mean value −3sigma

Quartile1: first quartile

Quartile3: third quartile

Figure 9:
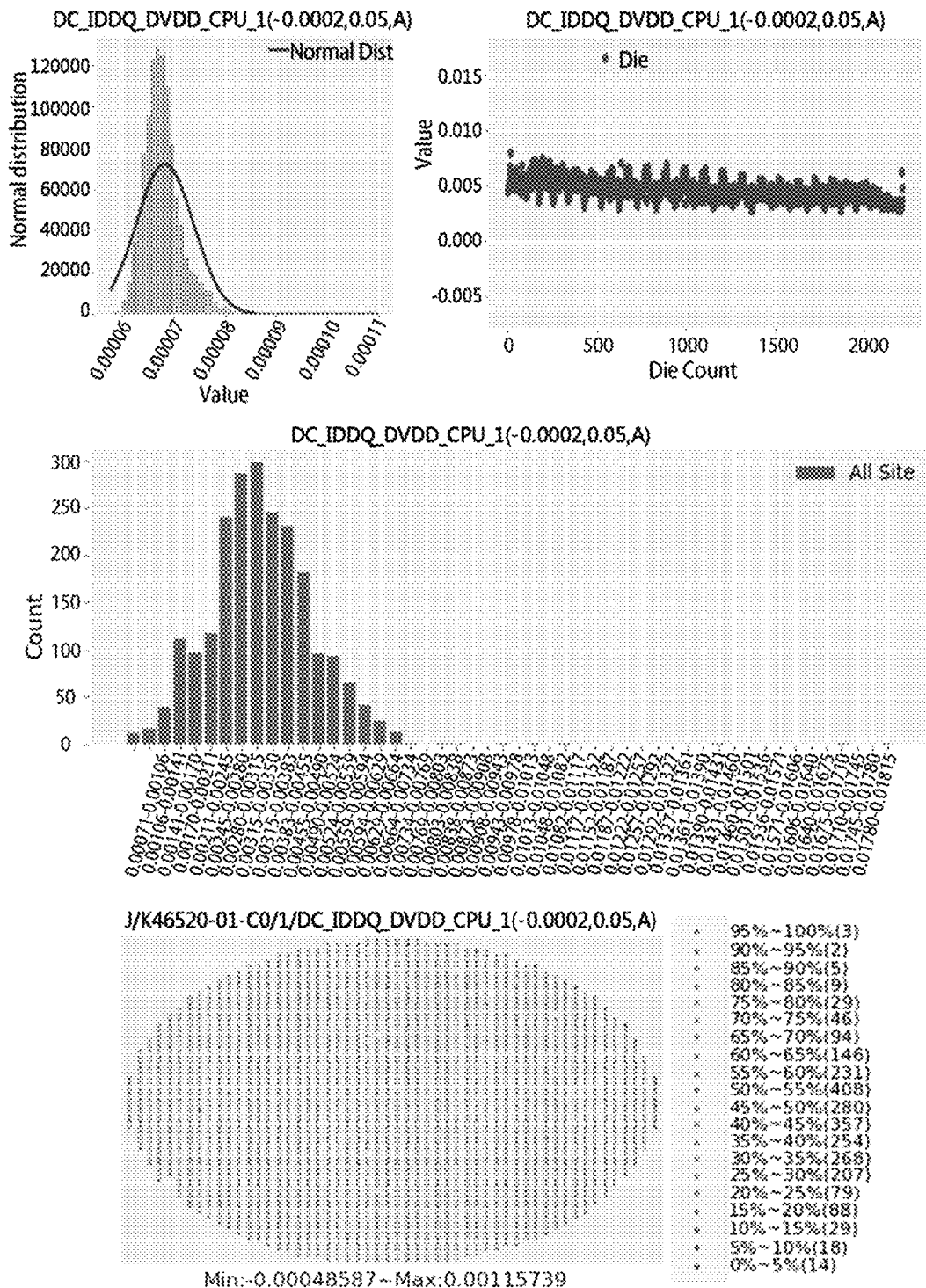
FIG. 9 is a schematic view of numerical value analysis.
Figure 11:
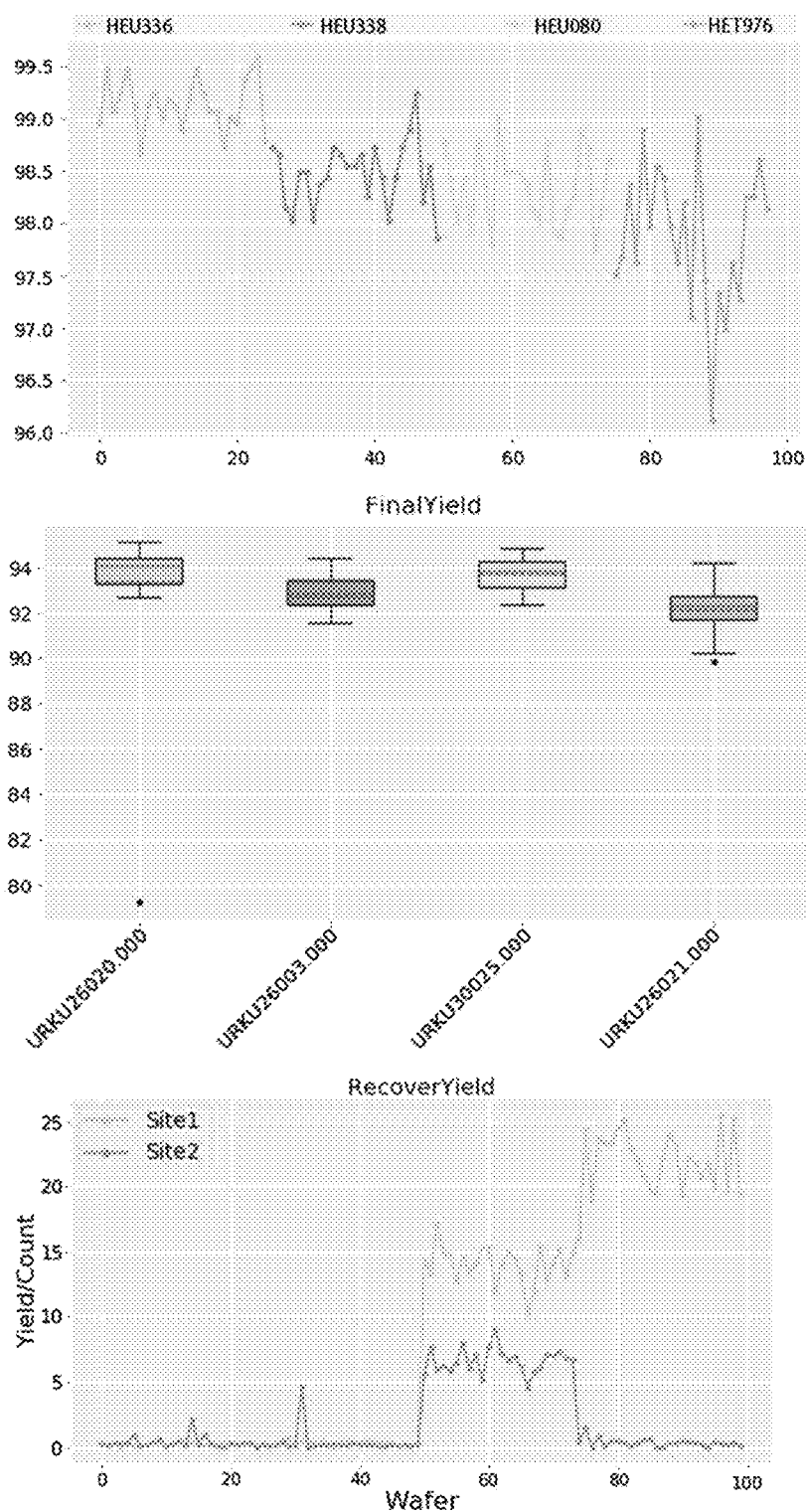
FIG. 11 is a schematic view of a linear diagram of site yield analysis.

"Numerical value analysis" comprises mean value analysis and standard deviation analysis of numerical values, and the like, as shown in FIG. 9.

The test parameter index analysis has the following advantages. Hundreds or even thousands of test parameters are converted into an intuitive and visual chart. Meanwhile, the distribution of any one test parameter in one map can be formed as a test value map. The change in color can clearly show the regional distribution and tendency. An intuitive determination can be made as to whether the wafer itself has any problem. The test value distribution in the whole map is also very important for factories that manufacture wafers.

(2) Test Yield Analysis

Data integration: U321: the column headings are fixed parameters, including: FinalYield, FirstYield, RetestYield, RecoverYield, FinalPass, FirstPass, RetestCount, Recover- Count, TesterID, PCID, which respectively represent final yield, first yield, retest yield, recover yield, final pass number, first pass number, retest count, recover count, tester ID, and prober card ID.

U322: The number of source data is selected. The number of rows in the file corresponds to the number of data.

U323: The specific data is displayed, as shown in FIG. 10.

Figure 12:
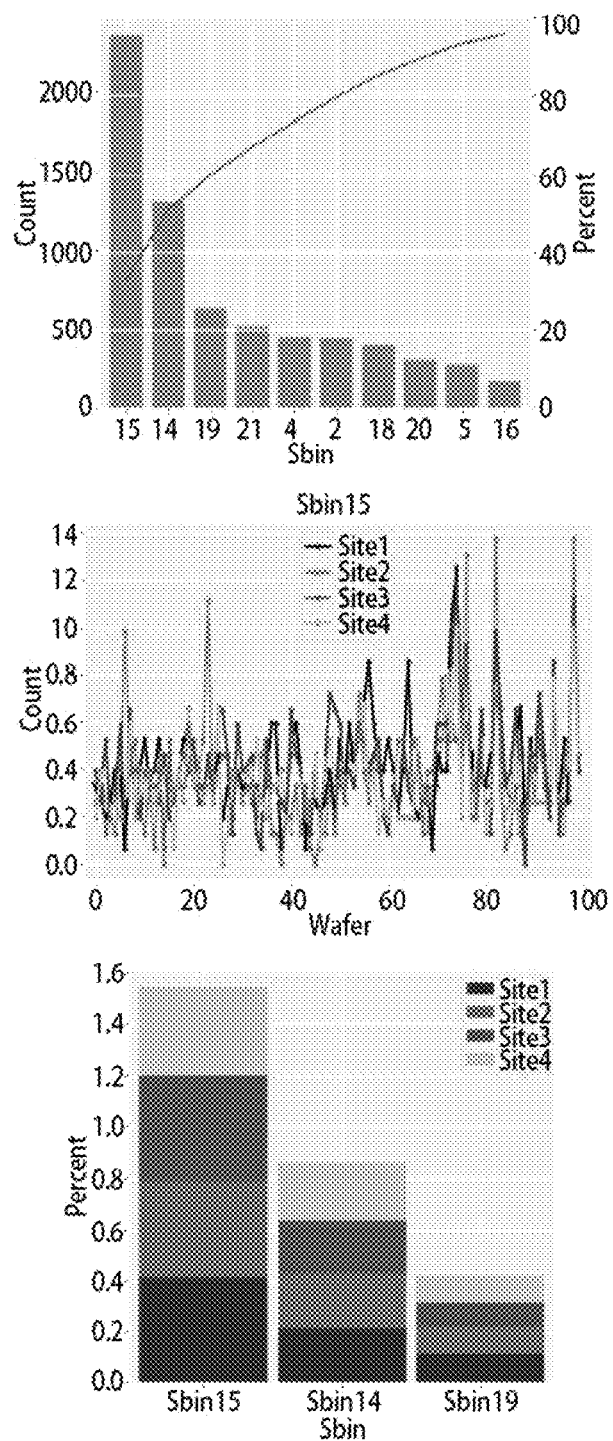
FIG. 12 is a schematic view of a linear diagram of sites.

The supported chart type:

rectified lot yield analysis diagram: values of different lots are shown in different colors, so that the difference in yield between lots can be clearly found;

prober card yield analysis diagram: a test yield analysis diagram is formed according to different test conditions, in order to view the difference in yield between different hardware;

linear site yield analysis diagram: different sites are drawn in a linear diagram, in order to intuitively find the difference in yield between sites;

failbin analysis diagram: the number of all failbins is sorted from the largest to the smallest, each test result bin is accumulated onto the previous number of all test result bins, and an accumulative percentage line is drawn, in order to find which test result bins cause the main fail and how much the influence is;

single-site fail analysis diagram: three failbins having a largest number are shown in a superimposed histogram, and the difference in yield between sites is found intuitively by the height of each site; and multi-site linear diagram: three failbins having a largest number are shown in a linear diagram, in order to analyze whether the fail number increases due to the difference in site, as shown in FIG. 12.

The test yield analysis has the following advantages. The test yield diagram is analyzed from a plurality of dimensions such as the rectified lot yield, the probercard influence, the difference in site, the failbin factor; and the quick statistics of the summary of each lot is done from the final yield, the first yield, the retest yield and the recover yield. In this way, it is able to find and analyze the regional distribution and tendency.

(3) Time Analysis

Data integration: U331: the column headings are fixed parameters, including: TotalTime, NormalTestTime, RetestTestTime, NormalPauseTime, NormalTotalTime, RetestPauseTime, RetestTotalTime, RetestFirstDieTime, TesterID, PCID, which respectively represent total test time, normal test time, retest test time, pause time during the normal test process, total normal test time, pause time during the retest process, total retest time, first die retest time, tester ID, and prober card ID.

U332: The number of source data is selected. The number of rows in the file corresponds to the number of data.

U333: The specific data is displayed, as shown in FIG. 13.

Figure 14:
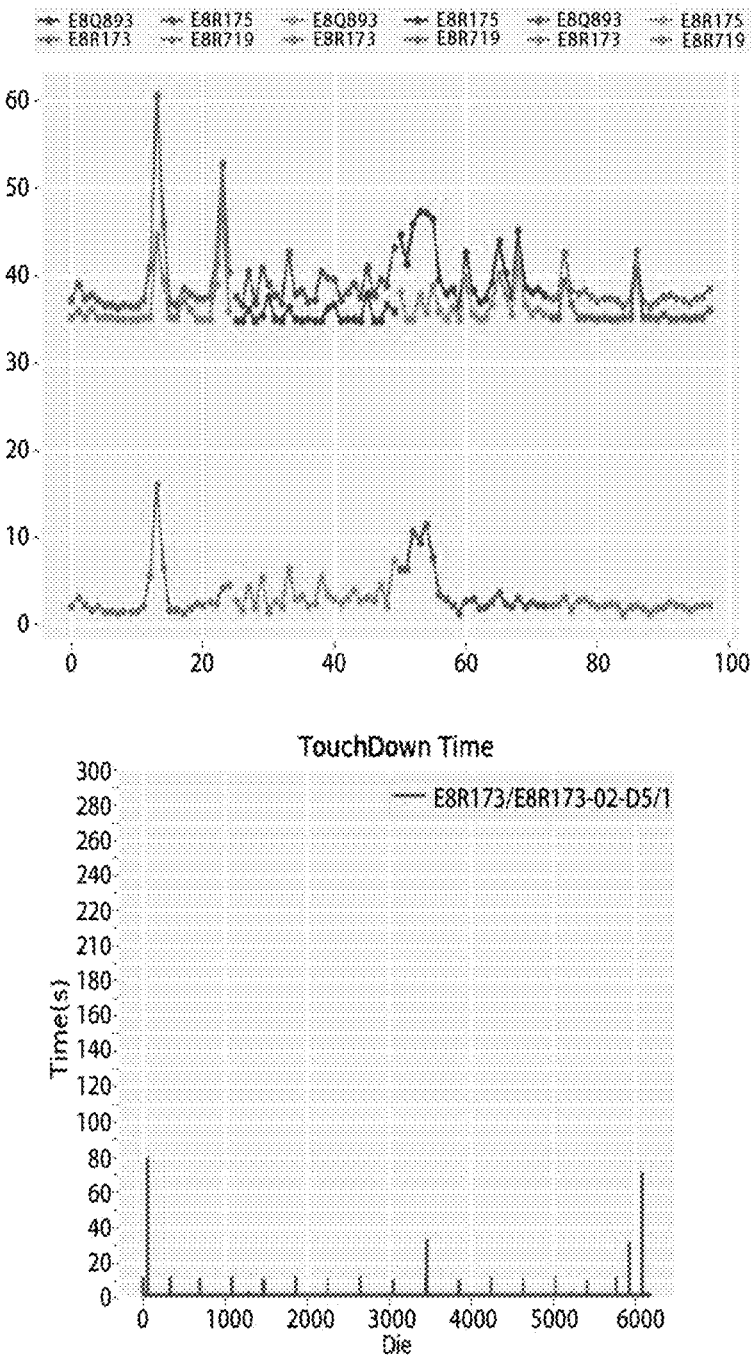
FIG. 14 is a schematic view of TouchDown analysis.

Rectified lot yield analysis diagram: values of different lots are shown in different colors, so that the difference in test time between lots can be clearly found;

TouchDown analysis: TouchDowndetail: the time of each touchdown is displayed, as shown in FIG. 14.

The time analysis has the following advantages: by viewing the test time of each die, the actual test time of each die can be obtained. Furthermore, for wafers having a long test time, the time interval can be viewed by touchdown to find the reason for the increased time, in order to improve the production efficiency.

(4) TskMap

It is mainly used to analyze the map of CP, including: distribution of all test result bins, distribution of retest and recover test result bins, and determination as to whether the map is abnormal by a plurality of algorithms; and a plurality of maps can be superposed to analyze the distribution of failbins.

Data integration: U351: the front four column headings are fixed parameters, including: BinCount, BinYield, S2S Count, S2S Yield, which respectively represent the number of test result bins, the percentage of test result bins, the number of site differences, the percentage of site differences, and the specific site information. The rest column headings are specific site information. The number of columns corresponds to the number of sites. The data represents the number of test result bins in each site.

U332: The number of source data is selected. The number of rows in the file corresponds to the number of data.

U333: The specific data is displayed, as shown in FIG. 15.

Figure 16:
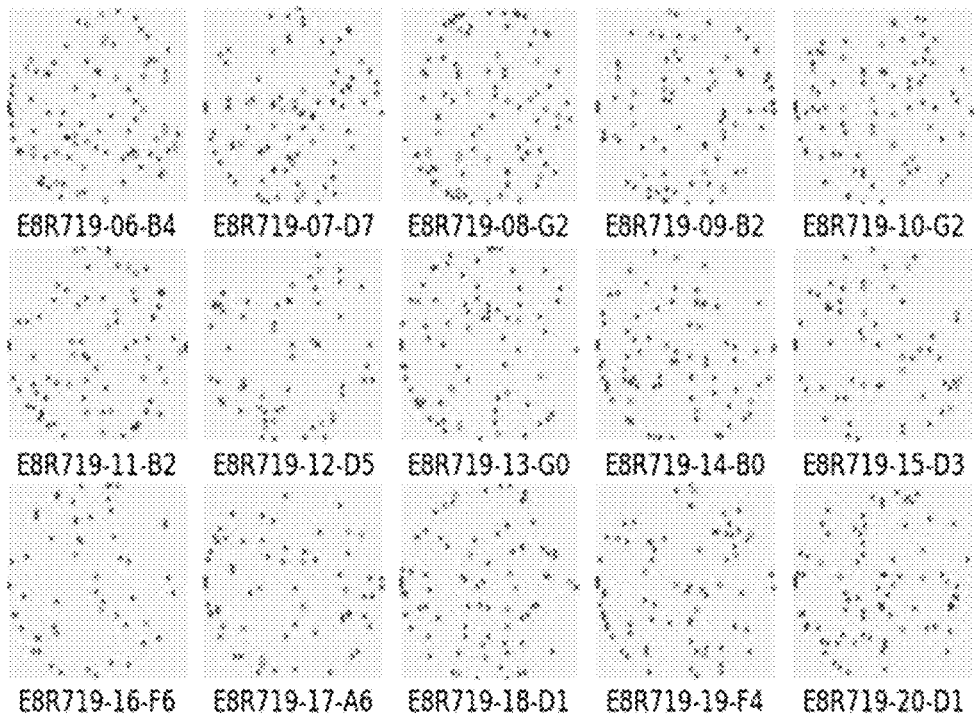
FIG. 16 is a schematic view of displaying the specific data in TskMap.

Distinguishing recover/retest in colors: to intuitively know the recover yield. If there are obvious patterns, it is indicated that there is difference in hardware. This provides guidance for the subsequent test and the yield improvement, as shown in FIG. 16.

"SummaryCheck": to view the test summary, and perform automatic determination according to the determination rule of a specific product to find the abnormal data quickly.

Yield determination: to intuitively find out the problem by colors. Also, first, the failed or abnormal test items can be directly tested, as shown in FIG. 17.

The data analysis sub-system 30 in this embodiment has other advantages:

(1) The system functions are automatically updated. In order to ensure that exe used by everyone is the latest version, the version of exe is to be determined. If the exe is not in the latest version, an exe executable file in the latest version will be downloaded from the server. The version No. can be found at the top of the tool when it is opened. The implementation codes are as follows:

```
VersionTxt = open(Path+'\\BigData_Version.txt') #打开文件
#对比文件
for line in VersionTxt: #遍历每行
    if line==VersionQuery:
        pass
    else:
        win32api.MessageBox(0, '需要更新软件 ', "消息框 ",win32con,MB_OK)
        ftp_server = '172.28.0.95'
        username = 'bigdata'
        password = 'sinoictest1'
        ftp=FTP( )
        ftp.set_debuglevel(2) #打开调试级别 2, 显示详细信息
        ftp.connect(ftp_server,21) #连接
        ftp.login(username,password) #登录, 如果匿名登录则用空串代替即可
        remotepath = '\\BigData\\BigData.exe'
        bufsize = 1024 #设置缓冲块大小
        localpath = Path+'\\BigData_New.exe'
        fp = open(localpath, 'wb') #以写模式在本地打开文件
        ftp.retrbinary('RETR ' + remotepath,fp.write,bufsize) #接收服务器上文件并写入本地文件
        ftp.set_debuglevel(0) #关闭调试
        fp.close( )
        ftp.quit( ) #退出 ft 服务器
        win32api.MessageBox(0,更新完成 , 请重新打开软件 ', "消息框 ",win32con.MB_OK)
        os._exit(0)
```

(2) All configuration files are shared to configure a file misoperation prevention mechanism: the data analysis sub-system 30 gathers many configuration files each having corresponding functions; for example, device setting configures the range of the map, and yield setting configures the determination rule of the product. If the administrator updates the configuration file, other people should use the latest configuration file. After any operation to the configuration file, the modified configuration file can be uploaded to the server. The configuration file in the server can be downloaded before the configuration file is used. Additionally, if there is any misoperation or uncertainty, the modified configuration file may not be uploaded, and instead, only the local configuration file is updated. When it is confirmed that there is no problem in the modified configuration file, it can be uploaded to the server. This prevents the configuration files used by all people from being mistakenly updated by the misoperation.

```
ftp_server = '172.28.0.95'
username = 'bigdata'
password = 'sinoictest1'
ftp=FTP( )
ftp.set_debuglevel(2) #打开调试级别2, 显示详细信息
ftp.connect(ftp_server,21) #连接
ftp.login(username,password) #登录, 如果匿名登录则用空串代替即可
#上传文件2
remotepath = '\BigData\\TskMap_Config.ini'
bufsize = 1024
localpath = Path+'\\TskMap_Config.ini'
fp = open(localpath, 'rb')
ftp.storbinary('STOR '+ remotepath ,fp,bufsize) #上传文件
ftp.set_debuglevel(0) #关闭调试
fp.close( )
ftp.quit( ) #退出ftp服务器
```

(3) The core algorithm is analyzed:

By taking a fail as a center, any one fail is found from the surrounding eight points (top left, top, top right, right, bottom right, bottom, bottom left, left). If there is no fail, it is considered that the fail count in the nine boxes is the sum of the current fails. If there is any fail, the above process is repeated by taking any one fail as a center. Of course, the previous fail cannot be included. This process is repeated until there is no fail in the surrounding eight points. If the total fail count is greater than a preset count, it is considered to be failed. It will be displayed in the drawing.

The difficulty is to exclude the previous fail during the termination, so that the previous fail is not double counted. Therefore, during the circulation, there will be two list variables, one of which is a list of all fails counted at present, and the other of which is a list of fails surrounding the current fail. The two lists are dynamically updated to avoid double counting. Some key implementation codes are as follows:

```
def AroundFail(a,b,c):
    global FailCount
    ListXYTemp=[ ]
    if str(int(a)-1)+'/'+str(int(b)-1) in c.keys( ):
        if str(int(a)-1)+'/'+str(int(b)-1) not in ListXY:
            FailCount+=1
            ListXY.append(str(int(a)-1)+'/'+str(int(b)-1))
            ListXYTemp.append(str(int(a)-1)+'/'+str(int(b)-1))
    if a+'/'+str(int(b)-1) in c.keys( ):
        if a+'/'+str(int(b)-1) not in ListXY:
            FailCount+=1
            ListXY.append(a+'/'+str(int(b)-1))
            ListXYTemp.append(a+'/'+str(int(b)-1))
    if str(int(a)+1)+'/'+str(int(b)-1) in c.keys( ):
        if str(int(a)+1)+'/'+str(int(b)-1) not in ListXY:
            FailCount+=1
            ListXY.append(str(int(a)+1)+'/'+str(int(b)-1))
            ListXYTemp.append(str(int(a)+1)+'/'+str(int(b)-1))
    if str(int(a)+1)+'/'+b in c.keys( ):
```

-continued

```
        if str(int(a)+1)+'/'+b not in ListXY:
            FailCount+=1
            ListXY.append(str(int(a)+1)+'/'+b)
            ListXYTemp.append(str(int(a)+1)+'/'+b)
    if str(int(a)+1)+'/'+str(int(b)+1) in c.keys( ):
        if str(int(a)+1)+'/'+str(int(b)+1) not in ListXY:
            FailCount+=1
            ListXY.append(str(int(a)+1)+'/'+str(int(b)+1))
            ListXYTemp.append(str(int(a)+1)+'/'+str(int(b)+1))
```

The continuous fail algorithm in the map in transverse and longitude directions is specifically as follows. By taking one fail as a center, fails are found in the transverse direction of the X-axis. If the continuous fail count is greater than a preset count, it is considered to be failed. If there is pass, they are all zeroed. Then, fails are found in the longitudinal direction of the Y-axis. The specific process is the same as that for the X-axis.

The difficulty is to respectively count the fails in the X-axis and the Y-axis and then merge the results together. Therefore, in the algorithm, values in the X-axis and the Y-axis need to be stored in two variables, and finally the merged result is put in a final variable. The final result is depicted by this variable. Some key implementation codes are as follows:

```
def ForKeys(d,a,b,c):
    ListXX=d
    if d==[ ]:
        #print(d)
        if ListALL==[ ]:
            return
        ListAll[len(ListAll)-1].remove(a+'/'+b)
        if ListAll[len(ListAll-1]==[ ]:
            ListAll.pop( )
            if ListAll==[ ]:
                return
        for listItem in ListAll[len(ListAll)-1]:
            KeySplit=listItem.split('/')
            X=KeySplit[0]
            Y=KeySplit[1]
            AroundFail(X,Y,c)
    else:
        ListAll.append(d)
        for listItem in ListXX:
            KeySplit=listItem.split('/')
            X=KeySplit[0]
            Y=KeySplit[1]
            AroundFail(X,Y,c)
```

The continuous fail algorithm in sites is specifically as follows. By taking one fail as a center, a site, which is continuous to the site of this fail, is found to determine whether this site is failed. If the continuous fail count is greater than the preset count, it is considered to be failed.

The difficulty lies in that: almost every CP requires retests in which: the previous test results are replaced with the final results, without changing its testing sequence, then determination is made as to whether the sites are consistent, and finally the continuous fail count is determined. Therefore, first, the sites are divided into groups for circular determination. By one dictionary, the XY-coordinate is used as a key, and the testing sequence is used as a value. The same values, the XY-coordinate of which is key, after the retests are replaced. All pass/fail results are listed in one order list. Finally, the continuous fail count is determined whether to be greater than the preset count by the order list. The key implementation codes are as follows:

```
SiteGroupDF=PdMap.groupby(PdMap['Site'])  #对地在进行分组
for name,group in SiteGroupDF:
    ListName=[ ]
    DictXY=[ ]
    ListPF=[ ]
    ListXtemp=[ ]
    ListYtemp=[ ]
    ListListX=[ ]
    ListListY=[ ]
    passint=0
    failint=0
    iCount=0
    for in in range(len(group)):
        if group.iloc[i,8] not in DictXY.keys( ):
            DictXY[group.iloc[i,8]]=iCount
            ListPF.append(group.iloc[i,5])
            ListXtemp.append(group.iloc[i,0])
            ListYtemp.append(group.iloc[i,1])
            iCount+=1
        else:
            ListPF[DictXY[group.iloc[i,8]]]=group.iloc[i,5]
            ListXtemp[DictXY[group.iloc[i,8]]]=group.iloc[i,0]
            ListYtemp[DictXY[group.iloc[i,8]]]=group.iloc[i,1]
    ListX=[ ]
    ListY=[ ]
    FlagPass=False
```

The continuous fail algorithm in TD is specifically as follows. By taking one fail as a center, a touchdown that is continuous to the fail is found. If there is one fail in the touchdown, the fail count is accumulated. Once the fail count is greater than the preset count, it is considered to be failed. The difficulty is to determine whether the touchdown is continuous. Also, it requires retests. Therefore, it is needed to replace the previous values with the retested values. Then, determination is made by grouping according to the time. The pass/fail results are connected in one order list. In this way, determined can be made as to whether the fails are continuous. The key implementation codes are as follows:

```
SiteGroupDF=NewDF.groupby(NewDF['Time'])  #对地在进行分组
for name,group in SiteGroupDF:
    FlagFail=False
    for i in range(len(group)):
        if group.iloc[i,2]==0:
            ListX.append(group.iloc[i,0])
            ListY.append(group.iloc[i,1])
            FlagFail=True
    if FlagFail==True:
        failint+=1
        if failint>=Num:
            if FlagPass==False:
                ListListX.append(ListX)
                ListListY.append(ListY)
                FlagPass=True
        ListPF.append(0)
    else:
        failint=0
        FlagPass=False
        ListPF.append(1)
    ListX=[ ]
    ListY=[ ]
```

Original→retest distribution view: all retested dies are list and compared with the previous bin IDs. If a die changes from fail to pass, it is shown in green; if a die changes from fail to fail, and if the bin does not change, it is shown in yellow; if the bin changes, it is shown in red. The difficulty is to show in a visual chart. It is needed to list all bins, fill the numbers in the circles, correspondingly change the size of the circles according to the number, and distinguish them in different colors. Some key implementation codes are as follows:

```
for Key in DictXYHbinTemp.keys( ):
    if '->' in str(DictXYHbinTemp[key]):
        ValueSplitHbin=DictXYHbinTemp[key].split('->')
        FirstHbin=ValueSplitHbin[0]
        FinalHbin=ValueSplitHbin[len(ValueSplitHbin)-1]
        XPoskey=DictHbinPos[FirstHbin]
        YPoskey=DictHbinPos[FinalHbin]
        XYKey=str(Xposkey)+'/'+str(Yposkey)
        DictXYHbin[key]=DictXYHbinTemp[key]
        DictXYcount[XYKey]=0
        PFsplit=DictPFTemp[key].split('->')
        if PFsplit[0]=='0' and PFsplit[len(PFsplit)-1]=='1':
            DictPF[XYKey]='G'
        elif PFsplit[0]=='0' and PFsplit[len(PFsplit)-1]=='0':
            if XPoskey==YPoskey:
                DictPF[XYKey]='Y'
            else:
                DictPF[XYKey]='R'
        elif PFsplit[0]=='1' and PFsplit[len(PFsplit)-1]=='1':
            DictPF[XYKey]='B'
for key in DictXYHbin.keys( ):
    if '->' in str(DictXYHbin[key]):
        ValueSplitHbin=DictXYHbin[key].split('->')
        FirstHbin=ValueSplitHbin[0]
        FinalHbin=ValueSplitHbin[len(ValueSplitHbin)-1]
        XPoskey=DictHbinPos[FirstHbin]
        YPoskey=DictHbinPos[FinalHbin]
        XYKey=str(XPoskey)+'/'+str(YPoskey)
        DictXYcount[XYKey]+=1
```

By developing the final yield, first yield, retest yield and recover yield (shown in grid tables and in visual manner) and online intelligent analysis modules such as the test time and the test map, the data analysis sub-system in the embodiment of the present invention has multi-dimensional analysis functions such as Wafer Lot Yield summary, Wafer Lot BinMap, Wafer Lot StackMap, Probe/Setting, 6sigma, Test time, SummaryCheck, Probe/Setting. Report. By the big-data analysis result, the interconnection and the communication between a plurality of platforms are realized. By extracting, splitting, analyzing and merging by certain algorithms, the data can be converted into simple and understandable files and charts from which the desired analysis result can be quickly obtained by people in different fields.

The data analysis sub-system in the embodiment of the present invention can realize the real-time performance, mobility and intelligence of office work. It has the advantages of remote data communication and remote data backup, and is high in security. By continuous data accumulation, for example, six months to one year of data accumulation, the data analysis sub-system 30 introduces an industrial big-data analysis module to realize data retrieval, tracking, analysis, early-warning and anticipation for the full-eco-chain test information, thereby instructing the production and improving both the production efficiency and the test yield.

In an embodiment, the method further comprises: monitoring, remotely and in real time, the IC test by a visualization technique.

Specifically, the monitoring, remotely and in real time, the IC test by a visualization technique may comprise: monitoring, remotely and in real time, the test prober and the tester in the IC test by a visualization technique; monitoring, remotely and in real time, the data collection, data processing, data analysis and data storage in the IC test by a visualization technique; and monitoring and managing, remotely and in real time, the whole process of the IC test by a visualization technique.

The method further comprises: when it is found that a test workshop is abnormal, sending an alarm signal; and in response to the alarm signal, processing the abnormality in the visual interface.

Wherein, the monitoring, remotely and in real time, the test prober by a visualization technique may specifically comprise: recording and displaying the number of continuous defective products; and if the recorded number of continuous defective products is greater than an input misjudgment threshold, sending an instruction to the automatic test prober to stop the test, and also sending an alarm instruction to give an alarm.

Correspondingly, the method can be implemented by a newly provided sub-system in the information management system for IC tests 100. In an embodiment, the information management system for IC tests 100 further comprises an unmanned-workshop industrial application sub-system 40.

Figure 18:
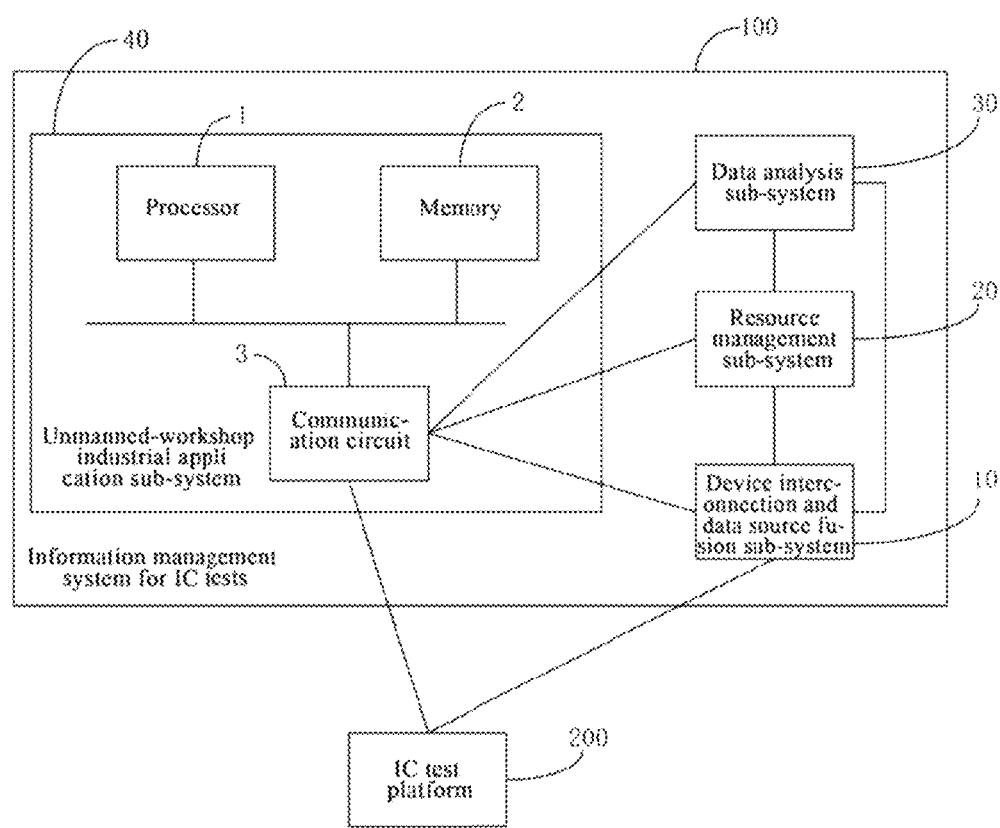
FIG. 18 is a structural diagram of another embodiment of the information management system for IC tests, according to the present invention.

Referring FIG. 18, in an embodiment, the unmanned-workshop industrial application sub-system 40 comprises a processor 1, a memory 2 and a communication circuit 3. The unmanned-workshop industrial application sub-system 40 is connected to the IC test platform 200, the device interconnection and data source fusion sub-system 10, the resource management sub-system 20 and the data analysis sub-system 30 by the communication circuit 3, respectively. The processor 1, the memory 2 and the communication circuit 3 of the unmanned-workshop industrial application sub-system 40 can implement, when in use, the step of monitoring, remotely and in real time, the IC test by a visualization technique.

Figure 19:
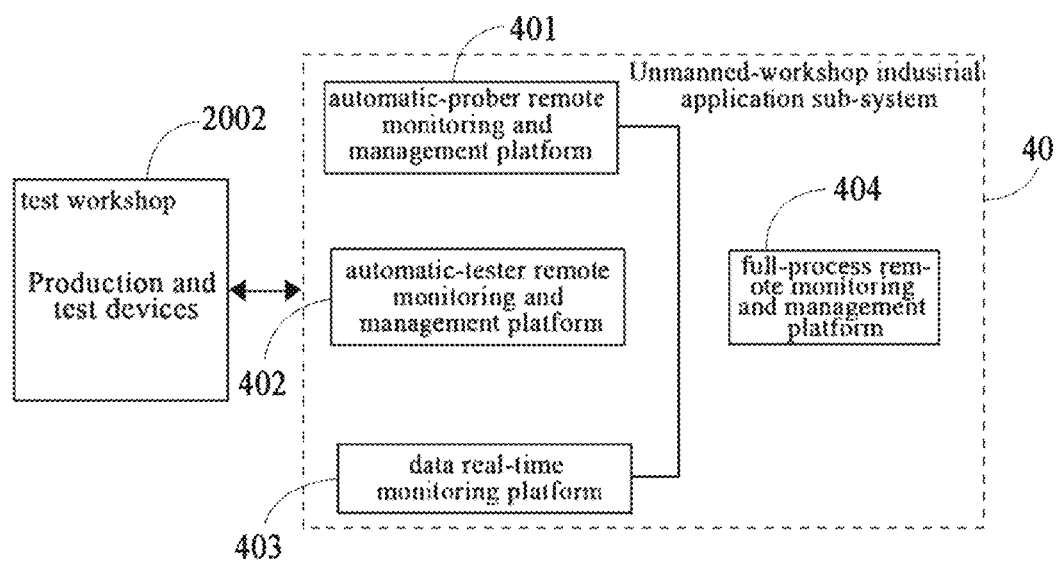
FIG. 19 is a structural diagram of another embodiment of the information management system for IC tests, according to the present invention.

Referring to FIG. 19, in an embodiment, the unmanned-workshop industrial application sub-system 40 is a remote real-time monitoring and visualization system. Specifically, the unmanned-workshop monitoring system 40 monitors and manages a test workshop 2002. The test workshop 2002 comprises production and test devices. The unmanned-workshop monitoring system 40 comprises: an automatic-prober remote monitoring and management platform 401, an automatic-tester remote monitoring and management platform 402, a data real-time monitoring platform 403, and a full-process remote monitoring and management platform 404. The test workshop 2002 gives off an alarm when an abnormality occurs, and the real-time monitoring and visualization system responds to the abnormality mechanism and the processing interface in real time.

Figure 20:
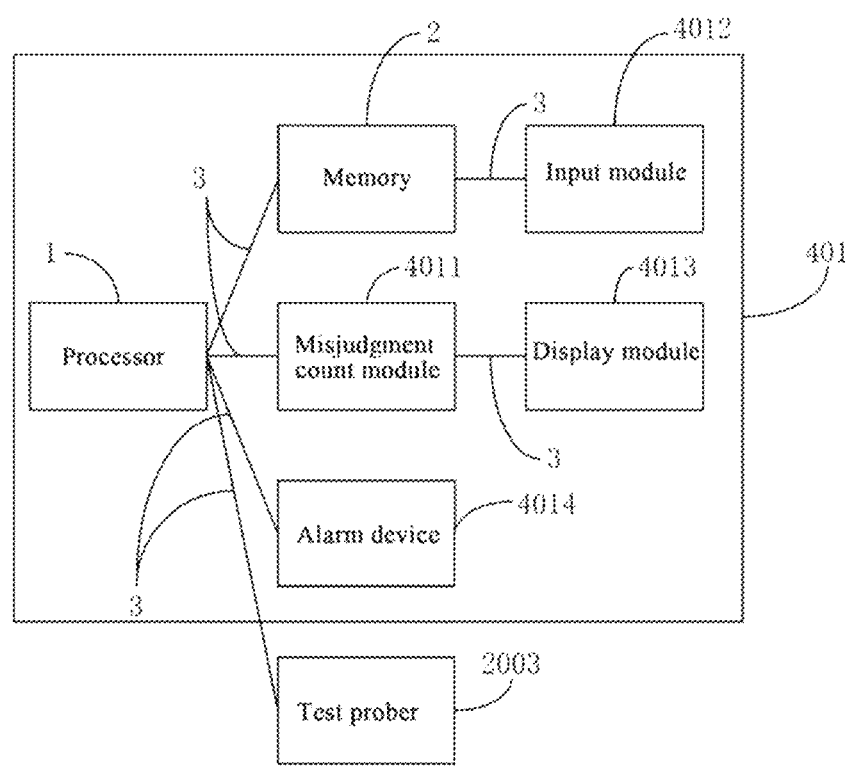
FIG. 20 is a structural diagram of another embodiment of the information management system for IC tests, according to the present invention.

Referring to FIG. 20, in an embodiment, the automatic-prober remote monitoring and management platform 401 comprises a processor 1, a memory 2, a communication circuit 3, a misjudgment count module 4011, an input module 4012, a display module 4013 and an alarm device 4014. The input module 4012 is connected to the memory 2 via the communication circuit 3. The processor 1 is respectively connected to the memory 2, the misjudgment count module 4011, the alarm device 4014 and the test prober 2003 via the communication circuit 3. The misjudgment count module 4011 is connected to the display module 4013 via the communication circuit 3. The input module 4012 is configured to input a misjudgment threshold which is stored in the memory 2. The misjudgment count module 4011 is configured to record the number of continuous defective products. The display module 4013 is configured to display the number of continuous defective products. The processor 1 is configured to decide whether to send an instruction to the test prober 2003 to stop the test, by judging whether the number of continuous defective products recorded by the misjudgment count module 4011 is greater than the misjudgment threshold. While sending an instruction to the test prober 2003 to stop the test, the processor 1 sends an alarm instruction to the alarm device 4014, to indicate the alarm device 4014 to give an alarm.

Figure 21:
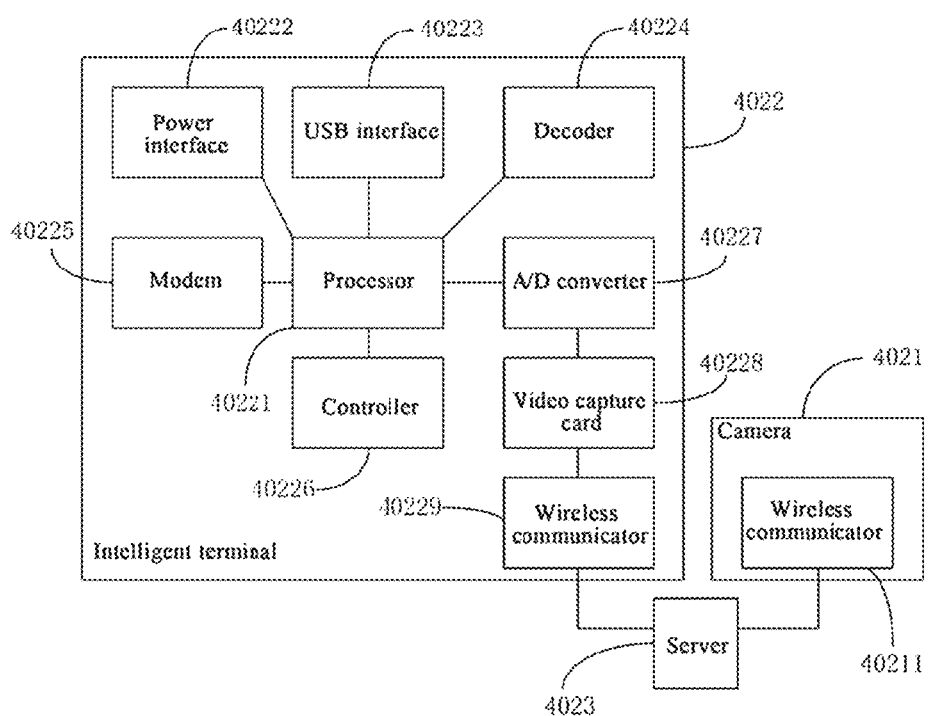
FIG. 21 is a structural diagram of another embodiment of the information management system for IC tests, according to the present invention.

Referring to FIG. 21, in an embodiment, the automatic-tester remote monitoring and management platform 402 comprises a camera 4021 and an intelligent terminal 4022. A wireless communicator 40211 is fixedly mounted inside the camera 4021, and the wireless communicator 40211 is connected to a server 4023. The server 4023 is connected to the intelligent terminal 4022. Furthermore, a processor 40221 is fixedly mounted inside the intelligent terminal 4022. The processor 40221 is connected to a power interface 40222, a USB interface 40223, a decoder 40224, a modem 40225, a controller 40226 and an A/D converter 40227, respectively. The A/D converter 40227 is connected to a video capture card 40228 which is connected to a wireless communicator 40229. The automatic-tester remote monitoring and management platform 402 performs remote monitoring and management based on the mobile internet, wherein a tablet is used as the intelligent terminal 4022.

Figure 22:
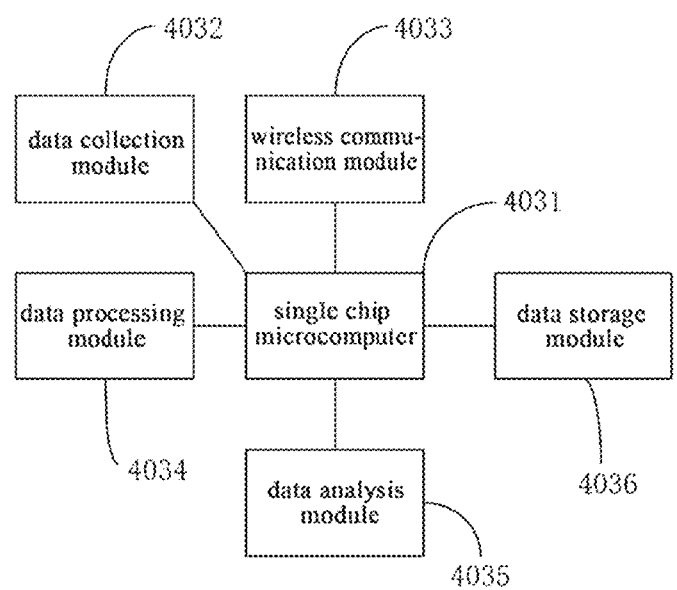
FIG. 22 is a structural diagram of another embodiment of the information management system for IC tests, according to the present invention.

Referring to FIG. 22, in an embodiment, the data real-time monitoring platform 403 comprises a data collection module 4032, a single chip microcomputer 4031, a wireless communication module 4033, a data processing module 4034, a data analysis module 4035, and a data storage module 4036. The data collection module 4032 is connected to the single chip microcomputer 4031. The single chip microcomputer 4031 is connected to the wireless communication module 4033. The data processing module 4034, the data analysis module 4035 and the data storage module 4036 each are connected to the single chip microcomputer 4031. The spatial distance of data monitoring is overcome, the networking is flexible, the performance is reliable and the cost is low.

The full-process remote monitoring and management platform 404 consists of a real physical system, a virtual information system, information feedback, information control, a monitoring and management platform, design alteration, manufacture alteration, data/information and digital model, which are all connected via Ethernet. The monitoring and management platform establishes, based on an IoT information sensing layer and by the VR technology, a three-dimensional visual digital model of the workshop and production line objects, to perform monitoring and management. During the whole design, manufacture and management, the real physical system and the virtual information system are highly integrated.

In conclusion, the information management system in the embodiment of the present invention can provide abundant and quick online services, improve the test efficiency, and improve the test capacity. By real-time integrating all states in a clean workshop (including the test prober, tester, test data, information charts) in the information system, the operator can monitor the state in the workshop in real time by staying in his workbench. The abnormalities can be responded in real time and positioned quickly. The abnormalities can be directly operated, controlled and solved by the operator in the information system, without a need of going to the devices (the time is saved by at least 80%). Meanwhile, labor cost is significantly reduced (for example, 100 test devices are now monitored by 20 persons, while in the present invention, 100 test devices can be monitored by only two or three persons). By giving off an alarm by the test workshop when an abnormality occurs, the real-time monitoring and visualization system can respond to the abnormality mechanism and the processing interface in real time. This realizes the transformation from a monitoring mode by making an inspection tour to an unmanned-workshop. The abnormality processing efficiency and the test efficiency are improved by 30%. The analysis by integrating big-data and AI algorithms realizes early-warning and anticipation. This plays a very important role in improving the test capacity, test yield and test quality.

The present invention further provides a machine-readable storage medium storing machine executable instructions which are configured to enable a machine to perform steps in any of the above methods.

The foregoing description merely shows preferred embodiments of the present invention and is not intended to limit the patent scope of the present invention. All equivalent structures or equivalent flow transformations made by using the contents of the specification of the present invention or direct or indirect applications in other related technical fields shall fall into the patent protection scope of the present invention.

The invention claimed is:

1. An information management method for IC tests, comprising the steps of: providing test data generated by performing an IC test by an IC test platform, the IC test platform being an IC test platform having more than one stage, each stage of the IC test platform comprising a plurality of test devices; providing resource data related to the IC test, other than the test data; and analyzing the IC test according to the test data of the IC test and the resource data, to obtain result data related to the IC test, wherein the IC test comprises at least one of a test in a design verification stage and a test in a production link; the test in the design verification stage comprises a wafer test; and the test in the production link comprises at least one of a process test in a wafer manufacture stage, a wafer test and a final test, and the method further comprises monitoring, remotely and in real time, the IC test by a visualization technique, and the monitoring comprises: monitoring the test prober and the tester in the IC test by the visualization technique, recording and displaying the number of continuous defective products, and if the recorded number of continuous defective products is greater than an input misjudgment threshold, sending an instruction to the test prober to stop the test, and also sending an alarm instruction to give an alarm.

2. The method according to claim 1, wherein the providing test data generated by performing an IC test by an IC test platform comprises: acquiring raw test data, in different formats, generated by performing the IC test by the IC test platform; and converting the raw test data into converted test data in a uniform format.

3. The method according to claim 2, wherein the IC test is a wafer test, the test data is generated by a plurality of testers of different types and comprises test data of each of wafers, and the resource data comprises test history data of each of wafers, which corresponds to the test data of each of the wafers; wherein, the resource data further comprises basic information data of each of wafers, which corresponds to the test data of each of the wafers; wherein, the resource data further comprises a state history data of a test prober when each of the wafers is tested, which corresponds to the test data of each of the wafers; wherein, the result data comprises a yield of each tested product, the fluctuation in the yield every day, and a change tendency of key parameters; and the method further comprises automatically pushing the result data to relevant personnel, wherein the result data is automatically pushed to relevant personnel via Email or WeChat.

4. The method according to claim 1, wherein the providing resource data related to the IC test, other than the test data, comprises: establishing, managing and real-time updating a test flow for the IC test; registering and managing information about a tested product for the IC test; registering and managing information about a test device for the IC test; monitoring and managing a job state for the IC test; monitoring and managing information about a test in the production link; verifying a test User Identification (UID) of a tested product and a UID in a server, and recording, in real time, the result of verification and a test version number; modifying, adding and deleting information about a wafer map of a tested product for the IC test; wherein, the IC test is a test in the production link; and the IC test is a wafer test or final test in the production link.

5. The method according to claim 1, wherein the analyzing comprises at least one of test parameter index analysis, test yield analysis, test time analysis, wafer map information analysis, test summary check and analysis, prober card touchdown analysis, result data feedback requirement analysis, and test history information analysis; wherein, the analyzing the IC test according to the test data of the IC test and the resource data to obtain result data related to the IC test comprises: receiving first relevant information, which is input to query resource data, the first relevant information comprising tested product name, test device, test lot and tester ID; receiving second relevant information, which is input to query resource data, the second relevant information comprising starting time and ending time; receiving third relevant information, which is input to query resource data, the third relevant information indicating that the test is a wafer test or a final test; receiving fourth relevant information, which is input to query resource data, the fourth relevant information indicating whether data in a database or local data is queried; according to the first relevant information, the second relevant information, the third relevant information and the fourth relevant information, reading a relevant file of the data, and displaying, in real time, reading progress and parameter information; receiving analysis function information, which is input and corresponds to an actual demand, and displaying a corresponding data format; and generating the analyzed result data according to the analysis function information; wherein, the result data is presented in at least one of files, report forms and charts; the method further comprises: according to the test data for the IC test, the resource data, and feedback requirements of the result data, analyzing the IC test to obtain result data which is related to the IC test and corresponds to the feedback requirements; and displaying, in at least one of files, report forms and charts, the result data on a visual interface; wherein, the result data corresponding to the test parameter index analysis comprises: a X-coordinate and a Y-coordinate, on a wafer, of each die in the wafer, a site corresponding to XY coordinates, the pass or fail result of the XY coordinates, the pass or fail result of a test item, and a specific test value of the test item; wherein, the result data corresponding to the test parameter index analysis is obtained by removing values indicating fail of a die, values indicating fail of a test item, IQR values greater than 1.5× test value, and IQR values greater than 3× test value; wherein, the result data corresponding to the test parameter index analysis is presented in a first chart; wherein, the first chart comprises a normal distribution plot, a scatter plot, a bar histogram, a box plot and a value map of the test item; wherein, marks of the first chart comprise: high limit, low limit, maximum value, minimum value, mean value, median value, standard deviation, mean value +3sigma, mean value −3sigma, first quartile and third quartile; wherein, numerical value analysis comprises mean value analysis and standard deviation analysis of numerical values; wherein, the result data corresponding to the test yield analysis comprises final yield, first yield, retest yield, recover yield, final pass number, first pass number, retest count, recover count, tester ID, and prober card ID; wherein, the result data corresponding to the test yield analysis is presented in a second chart; wherein, the second chart comprises: a rectified lot yield analysis diagram in which, values of tested products in different lots are shown in different colors, in order to analyze the difference in yield between tested product lots; a prober card yield analysis diagram in which, a test yield analysis diagram is formed according to different test conditions, in order to analyze the difference in yield between different hardware; a linear diagram of site yield analysis in which, different sites are drawn in a linear diagram, in order to analyze the difference in yield between sites; a failbin analysis diagram in which, the number of all failbins is sorted from the largest to the smallest, each test result bin is accumulated onto the previous number of all test result bins, and an accumulative percentage line is drawn, in order to analyze which test result bins cause the main fail and how much the influence is; a single-site fail analysis diagram in which, three failbins having a largest number are shown in a superimposed histogram, and the difference in yield between sites is analyzed by the height of each site; and a linear diagram of multiple sites in which, three failbins having a largest number are shown in a linear diagram, in order to analyze whether the fail number increases due to the difference in site; wherein, the result data corresponding to the test time analysis comprises: total test time, normal test time, retest test time, pause time during the normal test process, total normal test time, pause time during the retest process, total retest time, first die retest time, tester ID, and prober card ID; and the result data corresponding to the test time analysis is presented in a rectified lot yield analysis diagram in which values of different lots are shown in different colors in order to analyze the difference in test time between lots; wherein, the prober card touchdown analysis is to show the time of touchdown of each prober card; wherein, the wafer map information analysis comprises distribution of all test result bins, distribution of recover test result bins, and determination as to whether the map is abnormal by a plurality of analysis algorithms; and a plurality of maps can be superposed to analyze the distribution of failbins; wherein, the result data according to the wafer map information analysis comprises the number of test result bins, the percentage of test result bins, the number of site differences, the percentage of site differences, and the specific site information; wherein, the result data according to the wafer map information analysis is presented by distinguishing recover/retest in colors, by means of distinguishing recover/retest in colors, the recover yield can be analyzed and the presence or absence of obvious patterns can be determined, in order to analyze the difference between hardware, give instructions for the subsequent tests and to increase the yield; and wherein, the IC test is a test in the production link; and the IC test is a wafer test or final test in the production link.

6. The method according to claim 1, wherein, the monitoring, remotely and in real time, the IC test by a visualization technique further comprises: monitoring, remotely and in real time, the data collection, data processing, data analysis and data storage in the IC test by the visualization technique; monitoring and managing, remotely and in real time, the whole process of the IC test by the visualization technique; the method further comprises: when it is found that a test workshop is abnormal, sending an alarm signal; and in response to the alarm signal, processing the abnormality in the visual interface; and wherein, the IC test is a test in the production link; and the IC test is a wafer test or final test in the production link.

7. An information management system for IC tests, comprising a processor, a memory and a communication circuit, the processor being respectively coupled to the memory and the communication circuit, the system being connected to an IC test platform by the communication circuit to collect test data generated by performing an IC test by the IC test platform, wherein the processor, the memory and the communication circuit implement, when in use, steps in the method described in claim 1.

8. The system according to claim 7, wherein the system comprises: a device interconnection and data source fusion sub-system, comprising a processor, a memory and a communication circuit, wherein the device interconnection and data source fusion sub-system is connected to the IC test platform by the communication circuit, and the processor, the memory and the communication circuit implement, when in use, a step of providing test data generated by performing an IC test by an IC test platform; a resource management sub-system, comprising a processor, a memory and a communication circuit, wherein the processor, the memory and the communication circuit implement, when in use, a step of providing resource data related to the IC test, other than the test data; a data analysis sub-system, comprising a processor, a memory and a communication circuit, wherein the processor, the memory and the communication circuit implement, when in use, a step of analyzing the IC test according to the test data of the IC test and the resource data, to obtain result data related to the IC test; and the device interconnection and data source fusion sub-system, the resource management sub-system and the data analysis sub-system are connected by the respective communication circuits.

9. The system according to claim 8, wherein the device interconnection and data source fusion sub-system comprises a central server, a data pre-processing server and a first database server, the resource management sub-system comprises a second database server; the data analysis sub-system comprises an analysis server; the data pre-processing server, the first database server, the second database server, the analysis server and the testers each are connected to the central server, the second database server is further connected to the testers, the data pre-processing server is further connected to the first database server, and the analysis server is further connected to the first database server; during the test of each of wafers, corresponding test history data is stored in the second database server, the corresponding basic information data of each of the wafers is written in the second database server, and also the state history data of the test prober during the test of each of the wafers is written in the second database server; the raw test data generated by a plurality of testers of different types is stored in the central server; the central server distributes corresponding raw test data to the data pre-processing server according to the test history data of a wafer in the second database server; the data pre-processing server pre-processes the raw test data, converts the raw test data into converted test data in a uniform format, extracts key parameters, and stores the pre-processed data in the first database server; at the end of pre-processing, the central server assigns an analysis job to the analysis server, the analysis job carrying resource data which is stored in the second database server and is to be used in analysis; the analysis server acquires the pre-processed data from the first database server according to the analysis job, analyzes the pre-processed data and generates the result data, and automatically pushes the result data to relevant personnel via Email or WeChat so that the relevant personnel know, in real time, the yield of each tested product, the fluctuation in the yield every day, and a change tendency of key parameters; wherein, the first database server is an MongoDB database server and the second database server is an SQL database server.

10. The system according to claim 8, wherein the system further comprises: an unmanned-workshop industrial application sub-system, comprising a processor, a memory and a communication circuit, wherein the unmanned-workshop industrial application sub-system is connected to the IC test platform, the device interconnection and data source fusion sub-system, the resource management sub-system and the data analysis sub-system by the communication circuit, respectively, and the processor, the memory and the communication circuit implement, when in use, the step of monitoring, remotely and in real time, the IC test by a visualization technique.

11. A machine-readable storage medium storing machine executable instructions which are configured to enable a machine to perform steps in the method described in claim 1.

* * * * *